US012590896B2

(12) United States Patent
Levine et al.

(10) Patent No.: US 12,590,896 B2
(45) Date of Patent: Mar. 31, 2026

(54) APPARATUS AND METHOD FOR TRANSFERRING AND ANALYZING SUSPENDED PARTICLES IN A LIQUID SAMPLE

(71) Applicants:Robert A. Levine, Guilford, CT (US); Stephen C. Wardlaw, Lyme, CT (US)

(72) Inventors: Robert A. Levine, Guilford, CT (US); Stephen C. Wardlaw, Lyme, CT (US)

( * ) Notice: Subject to any disclaimer, the term of this patent is extended or adjusted under 35 U.S.C. 154(b) by 660 days.

(21) Appl. No.: 17/612,242

(22) PCT Filed: May 26, 2020

(86) PCT No.: PCT/US2020/070076
§ 371 (c)(1),
(2) Date: Nov. 18, 2021

(87) PCT Pub. No.: WO2020/243741
PCT Pub. Date: Dec. 3, 2020

(65) Prior Publication Data
US 2022/0221405 A1      Jul. 14, 2022

Related U.S. Application Data

(60) Provisional application No. 62/853,275, filed on May 28, 2019.

(51) Int. Cl.
B01L 3/00          (2006.01)
G01N 1/10          (2006.01)
G01N 21/64         (2006.01)

(52) U.S. Cl.
CPC .... G01N 21/6458 (2013.01); B01L 3/502715 (2013.01); B01L 3/502746 (2013.01);
(Continued)

(58) Field of Classification Search
CPC ........... B01L 3/50273; B01L 2200/027; B01L 2300/0861; B01L 3/5027; B01L 3/502707;
(Continued)

(56) References Cited

U.S. PATENT DOCUMENTS 3,447,863 A      6/1969  Patterson
3,883,247 A      5/1975  Adams
(Continued)

OTHER PUBLICATIONS

International Search Report for International Application No. PCT/US2020/070076, mailed Aug. 20, 2020 (4 pp).

*Primary Examiner* — Dean Kwak
(74) *Attorney, Agent, or Firm* — Getz Balich LLC

(57) ABSTRACT

The present invention relates to an apparatus. i.e. a device, for transferring a representative sample of a liquid containing particles into a chamber for analysis, such as for example, whole anticoagulated blood. The apparatus comprises an ante-chamber configured for receiving, containing, and transferring a portion of the sample to an analysis chamber. The chambers are continuous with each other, configured to allow the capillary flow of substantially the entirety of the contents of the ante-chamber into the analysis chamber to under-fill or substantially fill the analysis chamber. The apparatus can be conveniently configured as a disposable, single-use device, such as a dipstick, for performing both sampling and analysis from a single apparatus. The apparatus is useful for providing reliable and reproducible blood and body fluid analyses.

11 Claims, 17 Drawing Sheets

(52) U.S. Cl.
CPC ........... *G01N 1/10* (2013.01); *G01N 21/6428* (2013.01); *B01L 2300/0654* (2013.01); *B01L 2300/069* (2013.01); *B01L 2300/123* (2013.01); *B01L 2400/0406* (2013.01); *B01L 2400/086* (2013.01)

(58) Field of Classification Search
CPC ....... B01L 2200/025; B01L 2300/0654; B01L 2300/069; B01L 2300/0887; B01L 2300/0896; B01L 2300/123; B01L 2400/0406; B01L 2400/086; B01L 3/502715; B01L 3/502746; G01N 1/10; G01N 21/6428; G01N 21/6458; G01N 33/5094; G01N 33/80
See application file for complete search history.

(56) References Cited

U.S. PATENT DOCUMENTS

| | | | |
|---|---|---|---|
| 3,895,661 | A | 7/1975 | Praglin et al. |
| 3,916,205 | A | 10/1975 | Kleinerman |
| 3,925,166 | A | 12/1975 | Blume |
| 4,088,448 | A | 5/1978 | Lilja et al. |
| 4,171,866 | A | 10/1979 | Tolles |
| 4,264,560 | A | 4/1981 | Natelson |
| 4,427,294 | A | 1/1984 | Nardo |
| 4,550,417 | A | 10/1985 | Nungaki et al. |
| 4,558,014 | A | 12/1985 | Hirschfeld et al. |
| 4,596,035 | A | 6/1986 | Gershman et al. |
| 4,596,829 | A | 6/1986 | Takaya et al. |
| 4,689,307 | A | 8/1987 | Schwartz |
| 4,790,640 | A | 12/1988 | Nason |
| 4,853,210 | A | 8/1989 | Kass |
| 4,902,624 | A | 2/1990 | Columbus et al. |
| 4,911,782 | A | 3/1990 | Brown |
| 4,950,455 | A | 8/1990 | Smith |
| 5,028,529 | A | 7/1991 | Ericcson et al. |
| 5,096,669 | A | 3/1992 | Lauks et al. |
| 5,122,284 | A | 6/1992 | Braynin et al. |
| 5,132,097 | A | 7/1992 | Van Deusen et al. |
| 5,169,601 | A | 12/1992 | Ohta et al. |
| 5,184,188 | A | 2/1993 | Bull et al. |
| 5,223,219 | A | 6/1993 | Subramanian et al. |
| 5,275,951 | A | 1/1994 | Chow et al. |
| 5,281,540 | A | 1/1994 | Merkh et al. |
| 5,316,952 | A * | 5/1994 | Brimhall ........... B01L 3/502753 |
| | | | 422/947 |
| 5,362,648 | A | 11/1994 | Koreyasu et al. |
| 5,376,252 | A | 12/1994 | Ekstrom et al. |
| 5,397,479 | A | 3/1995 | Kass et al. |
| 5,427,959 | A | 6/1995 | Nishimura et al. |
| 5,431,880 | A | 7/1995 | Kramer |
| 5,472,671 | A | 12/1995 | Nilsson et al. |
| 5,482,829 | A | 1/1996 | Kass et al. |
| 5,503,803 | A | 4/1996 | Brown |
| 5,538,691 | A | 7/1996 | Tosa et al. |
| 5,547,849 | A | 8/1996 | Baer et al. |
| 5,585,246 | A | 12/1996 | Dubrow et al. |
| 5,591,403 | A | 1/1997 | Gavin et al. |
| 5,608,519 | A | 3/1997 | Gourley et al. |
| 5,623,415 | A | 4/1997 | O'Bryan et al. |
| 5,627,041 | A | 5/1997 | Shartle |
| 5,638,828 | A | 6/1997 | Lauks et al. |
| 5,641,458 | A | 6/1997 | Shockley et al. |
| 5,646,046 | A | 7/1997 | Fischer et al. |
| 5,674,457 | A | 10/1997 | Williamsson et al. |
| 5,681,529 | A | 10/1997 | Taguchi et al. |
| 5,768,407 | A | 6/1998 | Shen et al. |
| 5,776,078 | A * | 7/1998 | Wardlaw ................ G01N 21/07 |
| | | | 600/576 |
| 5,781,303 | A | 7/1998 | Berndt |
| 5,787,189 | A | 7/1998 | Lee et al. |
| 5,800,781 | A | 9/1998 | Gavin et al. |
| 5,879,628 | A | 3/1999 | Ridgeway et al. |
| 5,912,134 | A | 6/1999 | Shartle |
| 5,939,326 | A | 8/1999 | Chupp et al. |
| 5,948,686 | A | 9/1999 | Wardlaw |
| 5,968,453 | A | 10/1999 | Shugart |
| 5,985,218 | A | 11/1999 | Goodale |
| 6,004,821 | A | 12/1999 | Levine et al. |
| 6,016,367 | A | 1/2000 | Benedetti et al. |
| 6,016,712 | A | 1/2000 | Warden et al. |
| 6,022,734 | A | 2/2000 | Wardlaw |
| 6,106,778 | A | 8/2000 | Oku et al. |
| 6,130,098 | A | 10/2000 | Handique et al. |
| 6,150,178 | A | 11/2000 | Cesarczyk et al. |
| 6,176,962 | B1 | 1/2001 | Soan et al. |
| 6,188,474 | B1 | 2/2001 | Dussault et al. |
| 6,235,536 | B1 | 5/2001 | Wardlaw |
| 6,261,519 | B1 | 7/2001 | Harding et al. |
| 6,350,613 | B1 | 2/2002 | Wardlaw et al. |
| 6,365,111 | B1 | 4/2002 | Bass |
| 6,395,232 | B1 | 5/2002 | McBride |
| 6,420,114 | B1 | 7/2002 | Bedilion et al. |
| 6,448,088 | B1 * | 9/2002 | Levine ............... G01N 33/5002 |
| | | | 436/63 |
| 6,448,090 | B1 | 9/2002 | McBride |
| 6,468,807 | B1 | 10/2002 | Svensson et al. |
| 6,521,182 | B1 | 2/2003 | Shartle et al. |
| 6,537,501 | B1 | 3/2003 | Holl et al. |
| 6,544,793 | B2 | 4/2003 | Berndt |
| 6,551,554 | B1 | 4/2003 | Vermeiden et al. |
| 6,573,988 | B1 | 6/2003 | Thomesen et al. |
| 6,576,194 | B1 | 6/2003 | Holl et al. |
| 6,597,438 | B1 | 7/2003 | Cabuz et al. |
| 6,613,286 | B2 | 9/2003 | Braun et al. |
| 6,623,701 | B1 | 9/2003 | Eichele et al. |
| 6,656,431 | B2 | 12/2003 | Holl et al. |
| 6,712,925 | B1 | 3/2004 | Holl et al. |
| 6,723,290 | B1 | 4/2004 | Wardlaw |
| 6,766,817 | B2 | 7/2004 | da Silva |
| 6,783,736 | B1 | 8/2004 | Taylor et al. |
| 6,838,055 | B2 | 1/2005 | Sando et al. |
| 6,852,284 | B1 | 2/2005 | Holl et al. |
| 6,866,675 | B2 | 3/2005 | Perez et al. |
| 6,866,823 | B2 | 3/2005 | Wardlaw |
| 6,869,570 | B2 | 3/2005 | Wardlaw |
| 6,929,953 | B1 | 8/2005 | Wardlaw |
| 6,974,692 | B2 | 12/2005 | Chang |
| 7,000,330 | B2 | 2/2006 | Schwitchtenberg et al. |
| 7,010,391 | B2 | 3/2006 | Handique et al. |
| 7,220,593 | B2 | 5/2007 | Haubert et al. |
| 7,226,562 | B2 | 6/2007 | Holl et al. |
| 7,277,166 | B2 | 10/2007 | Padmanabhan et al. |
| 7,329,538 | B2 | 2/2008 | Wainwright et al. |
| 7,351,379 | B2 | 4/2008 | Schleifer |
| 7,364,699 | B2 | 4/2008 | Charlton |
| 7,381,374 | B2 | 6/2008 | Tsai et al. |
| 7,459,125 | B1 | 12/2008 | Stankov et al. |
| 7,468,160 | B2 | 12/2008 | Thompson et al. |
| 7,641,856 | B2 | 1/2010 | Padmanachan et al. |
| 7,671,974 | B2 | 3/2010 | O'Mahony et al. |
| 7,723,099 | B2 | 5/2010 | Miller et al. |
| 7,731,901 | B2 | 6/2010 | Wardlaw |
| 7,738,094 | B2 | 6/2010 | Goldberg |
| 7,744,819 | B2 | 6/2010 | Berndtsson et al. |
| 7,794,669 | B2 | 9/2010 | Gyonouchi et al. |
| 7,802,467 | B2 | 9/2010 | Wang |
| 7,850,916 | B2 | 12/2010 | Wardlaw |
| 7,871,813 | B2 | 1/2011 | Wyatt et al. |
| 7,903,241 | B2 | 3/2011 | Wardlaw et al. |
| 7,929,121 | B2 | 4/2011 | Wardlaw et al. |
| 7,929,122 | B2 | 4/2011 | Wardlaw et al. |
| 7,951,337 | B2 | 5/2011 | Vollert |
| 7,951,599 | B2 | 5/2011 | Levine et al. |
| 7,976,789 | B2 | 7/2011 | Kenis et al. |
| 7,978,329 | B2 | 7/2011 | Padmanabhan et al. |
| 7,995,194 | B2 | 8/2011 | Wardlaw et al. |
| 8,025,854 | B2 | 9/2011 | Ohman et al. |
| 8,033,162 | B2 | 10/2011 | Wang |
| 8,045,165 | B2 | 10/2011 | Wardlaw et al. |
| 8,071,051 | B2 | 12/2011 | Padmanabhan et al. |
| 8,077,296 | B2 | 12/2011 | Wardlaw et al. |

(56) References Cited

U.S. PATENT DOCUMENTS

| | | |
|---|---|---|
| 8,081,303 B2 | 12/2011 | Levine et al. |
| 8,092,758 B2 | 1/2012 | Lindberg et al. |
| 8,097,225 B2 | 1/2012 | Panmanachan et al. |
| 8,133,738 B2 | 3/2012 | Levine et al. |
| 8,158,434 B2 | 4/2012 | Wardlaw |
| 8,163,165 B2 | 4/2012 | Offenbacher et al. |
| 8,173,380 B2 | 5/2012 | Yang et al. |
| 8,221,985 B2 | 7/2012 | Wardlaw et al. |
| 8,241,572 B2 | 8/2012 | Wardlaw |
| 8,269,954 B2 | 9/2012 | Levine et al. |
| 8,284,384 B2 | 10/2012 | Levine et al. |
| 8,310,658 B2 | 11/2012 | Wardlaw et al. |
| 8,310,659 B2 | 11/2012 | Wardlaw et al. |
| 8,319,954 B2 | 11/2012 | Wardlaw et al. |
| 8,326,008 B2 | 12/2012 | Lalpuria |
| 8,361,799 B2 | 1/2013 | Levine et al. |
| 8,367,012 B2 | 2/2013 | Wardlaw |
| 8,467,063 B2 | 6/2013 | Wardlaw et al. |
| 8,472,693 B2 | 6/2013 | Davis et al. |
| 8,481,282 B2 | 7/2013 | Levine et al. |
| 8,502,963 B2 | 8/2013 | Levine et al. |
| 8,569,076 B2 | 10/2013 | Wardlaw et al. |
| 8,638,427 B2 | 1/2014 | Wardlaw et al. |
| 8,778,687 B2 | 7/2014 | Levine et al. |
| 8,781,203 B2 | 7/2014 | Davis et al. |
| 8,828,741 B2 | 9/2014 | Ermantraut et al. |
| 8,842,264 B2 | 9/2014 | Wardlaw et al. |
| 8,885,154 B2 | 11/2014 | Wardlaw et al. |
| 8,974,732 B2 | 3/2015 | Lalpuria et al. |
| 8,994,930 B2 | 3/2015 | Levine et al. |
| 9,046,473 B2 | 6/2015 | Levine et al. |
| 9,084,995 B2 | 7/2015 | Wardlaw |
| 9,199,233 B2 | 12/2015 | Wardlaw |
| 9,274,094 B2 | 3/2016 | Wardlaw et al. |
| 9,291,617 B2 | 3/2016 | Levine et al. |
| 9,322,835 B2 | 4/2016 | Wardlaw |
| 9,395,365 B2 | 7/2016 | Levine et al. |
| 9,523,670 B2 | 12/2016 | Mueller et al. |
| 9,576,180 B2 | 2/2017 | Xie et al. |
| 9,579,651 B2 | 2/2017 | Phan et al. |
| 9,638,912 B2 | 5/2017 | Wardlaw et al. |
| 9,696,252 B2 | 7/2017 | Wardlaw |
| 9,733,233 B2 | 8/2017 | Levine et al. |
| 9,873,118 B2 | 1/2018 | Verrant et al. |
| 9,885,701 B2 | 2/2018 | Xie et al. |
| 9,993,817 B2 | 6/2018 | Verrant et al. |
| 10,048,248 B2 | 8/2018 | Xie et al. |
| 10,203,275 B2 | 2/2019 | Herzog et al. |
| 10,391,487 B2 | 8/2019 | Verrant et al. |
| 10,578,602 B2 | 3/2020 | Wardlaw |
| 10,627,390 B2 | 4/2020 | Xie et al. |
| 11,583,851 B2 | 2/2023 | Verrant et al. |
| 2002/0025279 A1 | 2/2002 | Weigl et al. |
| 2003/0012697 A1 | 1/2003 | Hahn et al. |
| 2004/0072278 A1 | 4/2004 | Chou et al. |
| 2005/0047972 A1 | 3/2005 | Lauks et al. |
| 2006/0160164 A1 | 7/2006 | Miller et al. |
| 2006/0250604 A1 | 11/2006 | Hamada et al. |
| 2007/0025876 A1 | 2/2007 | Nishijima et al. |
| 2007/0036679 A1 | 2/2007 | Munenaka |
| 2007/0111302 A1 | 5/2007 | Handique et al. |
| 2007/0243117 A1 | 10/2007 | Wardlaw |
| 2007/0254372 A1 | 11/2007 | Bickel et al. |
| 2008/0176253 A1 | 7/2008 | Christodoulides et al. |
| 2008/0200343 A1 | 8/2008 | Clemens et al. |
| 2009/0011518 A1 | 1/2009 | Lindberg |
| 2009/0156966 A1 | 6/2009 | Kontschieder et al. |
| 2009/0286327 A1 | 11/2009 | Cho et al. |
| 2009/0291507 A1 | 11/2009 | Clemmens et al. |
| 2010/0021456 A1 | 1/2010 | Miossec et al. |
| 2010/0175999 A1 | 7/2010 | Barlow et al. |
| 2010/0189338 A1 | 7/2010 | Lin et al. |
| 2010/0209304 A1 | 8/2010 | Sarofim |
| 2010/0297708 A1 | 11/2010 | Collier et al. |
| 2011/0026009 A1 | 2/2011 | Knutson et al. |
| 2011/0044862 A1 | 2/2011 | Chang et al. |
| 2011/0136152 A1 | 6/2011 | Lin et al. |
| 2011/0164803 A1 | 7/2011 | Wang et al. |
| 2011/0192219 A1 | 8/2011 | Miyamura |
| 2011/0207621 A1 | 8/2011 | Montagu et al. |
| 2011/0214745 A1 | 9/2011 | Zhou et al. |
| 2011/0244581 A1* | 10/2011 | Nikonorov ............. G01N 35/08 |
| | | 422/400 |
| 2011/0293489 A1 | 12/2011 | Zhou et al. |
| 2012/0004139 A1 | 1/2012 | Staker |
| 2012/0034647 A1 | 2/2012 | Herzog |
| 2012/0082599 A1 | 4/2012 | Weber |
| 2012/0219457 A1* | 8/2012 | Verrant ............... B01L 3/50273 |
| | | 422/68.1 |
| 2013/0176551 A1 | 7/2013 | Wardlaw et al. |
| 2016/0151776 A1* | 6/2016 | Cremien .......... A61B 5/150343 |
| | | 422/520 |
| 2018/0141045 A1* | 5/2018 | Verrant ............. B01L 3/502707 |
| 2018/0310884 A1 | 11/2018 | Chickering, III et al. |

* cited by examiner

APPARATUS AND METHOD FOR TRANSFERRING AND ANALYZING SUSPENDED PARTICLES IN A LIQUID SAMPLE

CROSS-REFERENCE TO RELATED APPLICATIONS

This patent application is a national phase entry under 35 U.S.C. § 371 of International Application Number PCT/US2020/070076, filed May 26, 2020, which claims a benefit under 35 U.S.C. § 119(e) to the May 28, 2019 filing date of U.S. Provisional Patent Application Ser. No. 62/853,275, all of which are herein incorporated by reference in their entirety.

FIELD OF THE INVENTION

The present invention relates to an apparatus, i.e. a device, for transferring a representative sample of a liquid containing particles into a chamber for analysis, such as for example, whole non-coagulated blood. The apparatus comprises an ante-chamber configured for receiving, containing, and transferring a portion of the sample to an analysis chamber. The chambers are continuous with each other, configured to allow the capillary flow of substantially the entirety of the contents of the ante-chamber into the analysis chamber to under-fill or substantially fill the analysis chamber, and configured to maintain a liquid-air interface to maintain a negative pressure within the analysis chamber with respect to the ambient atmospheric pressure. The apparatus is preferably configured as a single construct device or dipstick for both the direct sampling and analysis of a sample without the need for a more complex cartridge device and a means for separately facilitating the transfer of the sample from a reservoir into an analysis chamber. The apparatus is useful for providing reliable and reproducible blood and body fluid analyses.

BACKGROUND OF THE INVENTION

The complete blood count (CBC) is the most frequently performed set of tests for whole blood and includes a number of separate analyses such as the white blood count (WBC), the red blood cell count (RBC), and platelet count, among others. The methods used vary in completeness of analyte set, complexity and cost of equipment, and per-test cost. The least complex methods, such as the QBC® method described in U.S. Pat. No. 4,156,570, to Wardlaw, issued May 29, 1979 have the least expensive capital costs and are simple to perform, but typically have higher per-test costs. The QBC® method is most suited for point-of-care situations where operator training is minimal and few tests are performed per day. On the other end of the spectrum, large volume blood analyzers used in hospitals or reference laboratories can have a capital about cost twenty times greater but a relatively low per-test cost when used on a large volume basis, which makes them much more cost-effective in those settings.

One of the simplest and oldest methods of counting cells involves the use of a hemocytometer. In a hemocytometer, a precise dilution of the blood is made. An approximate amount of that dilution is subsequently placed into a counting chamber with a height sufficient that the diluted sample, when flowing into the chamber, maintains the same uniformity of cells as is found in the diluted samples. That is, the chamber must not selectively concentrate or dilute any of the cells or other elements because of the sample flowing into and through the chamber. This is because only a representative fraction of the cells in a known area of the chamber is counted. If the distribution of the cells is skewed, such a count would therefore incorrectly reflect the count of the entire sample.

Larger modern systems, such as the Abbot Cell-Dyn®. or the Bayer Advia® are based upon some variation of a flow-cytometer (FC), where a precise quantity of blood is precisely diluted and mixed with reagents in a number of steps. Fluidic valves route the diluted sample into multiple test areas. As with the hemocytometer, the distribution of cells within the diluent must remain relatively homogeneous so that a count of a representative portion of the diluted sample can represent the count in the original sample. This approach requires a substantial instrumental complexity to the point where the reliability of these instruments is relatively low. In fact, with these larger systems it is not uncommon for preventative maintenance or repairs to be required on a weekly basis, or more often, which requires the skills of specially trained laboratory technologists or service technicians, all of which substantially add to the cost of operation. Another hidden cost of operation is the washing, cleaning and calibration procedures which are required to make the system perform properly.

In the QBC® system, an approximate quantity of blood is placed in a capillary tube, centrifuged and examined. This method, although not requiring an exact sample, does not produce true cell counts and cannot give accurate estimates of cell numbers when very few cells are present.

An intermediate system has been described in U.S. Pat. No. 6,723,290 B1, to Wardlaw, issued Apr. 20, 1994; U.S. Pat. No. 6,866,823 B2 to Wardlaw, issued Mar. 15, 2005; U.S. Pat. No. 6,869,570 B2, to Wardlaw, issued Mar. 22, 2005; and U.S. Pat. No. 6,929,953 B1, to Wardlaw, issued Aug. 16, 2005, wherein blood is placed into a single-use disposable device for analysis. These patents describe a reliable, low-cost, and easy-to-use method and instrument that can provide the same breadth of analytic data as the above-described flow-cytometric systems. In this system, an approximate quantity of the undiluted sample is placed in a disposable device whose characteristics allow the distribution of cells within the sample to remain substantially uniform. The cells in a given imaged field are counted, the volume of that field is determined, and the cell count per volume is then calculated. In this system, as with that of the hemocytometer, only a portion of the sample added to the chamber needs to be counted because the distribution of cells is substantially uniform. This method, however, requires a single-use disposable device, which is advantageous for low-volume testing, but which is not specifically intended for high-volume testing.

U.S. Pat. No. 8,241,572 B2, to Wardlaw, issued Aug. 14, 2012, U.S. Pat. No. 8,158,434 B2, to Wardlaw, issued Apr. 17, 2012, and U.S. Pat. No. 7,731,901 B2, to Wardlaw, issued Jun. 8, 2010 describe an apparatus and method for enumerating particulate constituents in a sample of whole blood, comprising a chamber which forms a thin film of whole anti-coagulated blood. However, a liquid containing particles, such as a sample of whole blood, does not have the same flow characteristics as one which does not, i.e. plasma. When transferring a portion of whole blood from a large sample container to a much smaller one, such as a thin-film chamber, it is difficult to ensure that the sample transferred to the analysis chamber has the same concentration of constituents as the original sample, because any movement of blood through a tube, particularly one of small diameter, can cause a separation of the particles and their concentration (or reduction), depending upon the flow characteristics. In the '572, '434, and '901 patents cited in this paragraph, the analysis chamber is of such a height that flow-induced changes in particle concentration is inevitable, if not desirable. Because all of the contents of the chamber are analyzed, location variations in composition within the chamber do not affect the final result. To accurately measure the concentration of particles in the original sample using these prior art chambers, requires the transfer of a very small portion, i.e. sub-microliters to several microliters, of the sample from a much larger pool of sample, and in a manner that does not alter the relative quantities of particles and fluids that enter the chamber.

Simply connecting the sampling chamber to the sample via simple tubing, such as a capillary tube or otherwise, would not solve the foregoing transfer problem, because the particle flow streaming changes the relative concentrations of components with the conduit as the sample reaches the analysis chamber, and also within the chamber itself. These changes vary with the plasma viscosity and the size and concentration of the particles within the plasma. Two means were previously described in an attempt to circumvent this problem. One means was to mechanically, or manually, extract the desired amount of sample via a pipette and transfer it directly and entirely into the analysis chamber. However, such a transfer requires skill and dexterity on the part of an operator. The other means, as described in U.S. Pat. No. 9,873,118 B2, to Verrant et al., issued Jan. 23, 2018 and U.S. Pat. No. 10,391,487 B2, to Verrant et al., issued Aug. 27, 2019, is to allow a portion of a well-mixed sample to contact one edge of a chamber that is part of an analysis cartridge for an analytical instrument. As the chamber of the cartridge begins to fill through capillary action, the process is monitored and the contact of the chamber and sample is broken when the chamber is filled to a predetermined point, thereby allowing the residual blood clinging to the side of the chamber to be drawn into the analysis chamber. However, both of these means require mechanical intervention.

The apparatus described in the '118 and '487 patents is essentially an analysis cartridge intended for use in conjunction with a specially designed analytical instrument for accepting the cartridge and also a further means, such as a pneumatic means, to transfer the sample from the collection portion of the cartridge into an analysis chamber. Furthermore, this system described in the '118 and '487 patents requires that: (i). the analysis instrument moves the analysis chamber and the ante-chamber relative to each other to make temporary fluidic contact, (ii). the pneumatic expression of blood from a pre-analytic chamber to form a drop that can be in fluidic contact with the entry edge of the analysis chamber; (iii). there be monitoring of the filling of the analysis chamber to avoid over filling, (iv) furthermore the instrument detects adequate filling of the analysis chamber, and then the instrument must separate the analytic chamber from the pre-analytic chamber to stop continued filling. The present invention eliminates these steps (i) through (iv) and thereby dramatically decreases both the mechanical complexity and cost of the cartridge and analytic instrument.

Based on the foregoing, it is seen that what is needed is a method and an apparatus for evaluating a sample of substantially undiluted biologic fluid, one capable of providing accurate results, one that does not use any or a significant volume of liquid reagent(s), one that does not require sample fluid flow during evaluation, one that can perform particle component analyses, one that does not require the instrumental monitoring and control of sample contact between the sample and the analysis chamber, and one that is cost-effective.

It would therefore be advantageous to have a system wherein the particles in an undiluted sample of whole blood could be both accurately enumerated and qualitatively analyzed in a chamber of sufficient thinness so that cell counts and cell morphology can be obtained from a sample, and wherein the effects of non-uniform distribution can be mitigated. Such an analytical system could reduce or eliminate the need for excessive fluid handling and the precise measurement or dilution of the sample, therefore resulting in a much simpler and less expensive method for such analyses, while reducing sample errors and increasing reliability. Furthermore, it would be advantageous to have a system for providing a means for sample transfer without the need for expensive and delicate mechanical means or any particular skill on the part of the operator.

SUMMARY OF THE INVENTION

The present invention relates to an apparatus, i.e., a device, for transferring a representative sample of a liquid containing particles into a chamber for analysis. The apparatus comprises an ante-chamber configured for receiving a representative portion of said sample and subsequently transferring said portion to an analysis chamber. The present invention also relates to methods of using the apparatuses of the present invention for receiving, transferring, and analyzing biological samples, such as blood samples.

It is an object of the invention to provide an apparatus and method for extracting a small sub-sample of whole blood from a larger parent sample without altering the concentration of particles in the sub-sample, and to transfer the entirety of the sub-sample into an analysis chamber for enumeration of the contained cells or particles.

It is a further object to do so without the use of any moveable means, either mechanical or manual, and to do so reliably, repeatedly, and reproducibly, even in the hands of relatively untrained users.

It is another object to provide a disposable analysis means which, when the analysis is complete, contains no spillable liquid, thus permitting safe disposal.

It is another object to provide a device that can essentially be used as a dipstick to efficiently sample a biological fluid such as blood.

The present invention relates to an apparatus for transferring a representative sample of a liquid containing particles into a chamber for analysis, comprising:

(a) an ante-chamber configured for receiving, containing, and transferring the representative portion of said sample to an analysis chamber, and (b) an analysis chamber configured for receiving the representative portion of said sample from the ante-chamber and containing the sample for particle analysis, wherein the ante-chamber and the analysis chamber are:

(i) continuous with each other, (ii) configured to allow the capillary flow of substantially the entirety of the contents of the ante-chamber into the analysis chamber to under-fill or substantially fill the analysis chamber, and (iii) configured such that at least one of either the analysis chamber or the ante-chamber maintains an unconstrained liquid-air interface to maintain a negative pressure, with respect to the ambient atmospheric pressure, within the analysis chamber.

In further embodiments the present invention relates to an apparatus wherein the ante-chamber and the analysis chamber are capable of being in fluid connection with each other.

In further embodiments the present invention relates to an apparatus comprising a first planar member a second planar member, and a plurality of separator elements disposed between the first planar member and the second planar member, each of said separator elements having a height defined by either h1 or h2, wherein a portion of the first planar member, a portion of the second planar member, and the separator elements having a height of h1 are configured to define the ante-chamber; wherein a portion of the first planar member, a portion of the second planar member, and the separator elements having a height of h2 are configured to define the analysis chamber; wherein the ratio of h1 to h2 is selected to have a value from about 1.5 to about 15; and wherein the first planar member and/or the separator elements are deformable relative to each other by capillary force in an amount such that the ante-chamber and the analysis chamber each assumes a mean chamber height substantially equal to their respective mean separator heights h1 and h2. The filling of the analysis chamber with a 4-micron high spacer and 250 to 400 nanoliters of anticoagulated blood requires about 20 to 60 seconds, depending upon the blood viscosity and the volume of the blood sample. The same volume of blood will fill the ante-chamber in less than about one to three seconds, thereby facilitating visualization for the user of the almost instantaneous filling of the ante-chamber, upon which then the ante-chamber and/or the source of the blood are moved away from each other. If a sample of blood is in contact with the ante-chamber, whose capacity is limited to less than about 90 percent of that of the capacity of the slower filling analysis chamber for a second or two longer than needed, the filling of the analysis chamber will only be increased by an amount less than that which can result in its overfilling because the filling of the analysis chamber is about ten to about fifty times slower. The relative filling rates can be influenced by the degree of hydrophilicity of the chambers as well as the height of the space of the chamber.

In further embodiments the present invention relates to an apparatus wherein the portion of the first planar member and of the second planar member configured to define the analysis chamber are transparent.

In further embodiments the present invention relates to an apparatus wherein the transparent portion of the first planar member and the second planar member are transparent to electromagnetic radiation having wavelengths selected from ultraviolet (UV), visible, and/or infrared (IR) wavelengths.

In further embodiments the present invention relates to an apparatus wherein the separator elements comprise a shape selected from spheres, parallelepipeds, and circular columns.

In further embodiments the present invention relates to an apparatus wherein said ante-chamber has a volume of from about 80% to about 90% of the volume of said analysis chamber.

In further embodiments the present invention relates to an apparatus wherein said analysis chamber has a volume from about 0.2 to about 1 microliters.

In further embodiments the present invention relates to an apparatus comprising one or more sidewalls extending between and in contact with the first planar member and the second planar member, wherein said one or more sidewalls are configured such that opposing ends of said ante-chamber and said analysis chamber are partially or fully open to the surroundings, i.e. such that the ante-chamber and the analysis chamber each comprise an opening to the atmosphere. In other words, the ante-chamber comprises an opening through which the biological sample is drawn into the ante-chamber, and the analysis chamber comprises an opening such that the air displaced by the sample as the sample is drawn into the chambers can escape, otherwise the uptake of the sample into the ante-chamber and the flow into and filling of the analysis chamber would be hampered or would not occur. The opening of the ante-chamber would comprise a sampling end of the apparatus, whereby when the apparatus is contacted with a fluid sample, the sample is drawn by capillary forces into the ante-chamber.

In further embodiments the present invention relates to an apparatus wherein the outer surfaces of the ante-chamber and analysis chamber further comprise a hydrophobic coating, examples of which include polyfluorinated polymers such as the perfluoroalkyl copolymer, FluoroPel, which is available from Cytonix LLC.

In further embodiments the present invention relates to an apparatus further comprising an absorbent means for removing excess sample from contact with said ante-chamber.

In further embodiments the present invention relates to an apparatus wherein a portion of the first planar member and/or of the second planar member configured to define said ante-chamber comprises a white or light color backing or coating to facilitate visualization of the progress of filling said ante-chamber.

In further embodiments the present invention relates to an apparatus wherein at least one of said first planar member or said second planar member extends beyond the area defining said analysis chamber and is configured to define a scribable region.

In further embodiments the present invention relates to an apparatus comprising at least one substantially rigid planar member defining the chambers and wherein said ante-chamber is incorporated into said substantially rigid planar member.

In further embodiments the present inventions relates to an apparatus that is in the form of a dipstick.

In further embodiments the present invention relates to an apparatus that is designed (or intended) for single use.

In further embodiments the present invention relates to an apparatus that is designed (or intended) to be disposable (after use).

In further embodiments the present invention relates to an apparatus wherein said ante-chamber is defined by a portion of the first planar member that extends beyond the area defined by the second planar member and said ante-chamber comprises a sample receiving area.

In further embodiments the present invention relates to an apparatus wherein the sample receiving area is a depression in the first planar member.

In further embodiments the present invention relates to an apparatus further comprising a receptacle and delivery tube.

In further embodiments the present invention relates to an apparatus wherein said liquid sample is a biologic fluid sample.

In further embodiments the present invention relates to an apparatus wherein said liquid sample is an anti-coagulated or a non-coagulated blood sample.

In further embodiments the present invention relates to an apparatus wherein said particles are biological particles.

In further embodiments the present invention relates to an apparatus wherein said biological particles are blood cells, preferably blood cells from human or animal origin.

In further embodiments the present invention relates to an apparatus wherein said biological particles are selected from hematoparasites or their insoluble waste products.

In further embodiments the present invention relates to a method of using an apparatus of the present invention for the sampling and analysis of a biological sample.

In further embodiments the present invention relates to a method of using the apparatus of the present invention for the sampling and analysis of a biological sample.

In further embodiments the present invention relates to a method comprising the step of contacting said apparatus with said biological sample or contacting said biological sample with said apparatus.

In further embodiments the present invention relates to a method of using the apparatus of the present invention for the sampling of an anti-coagulated or non-coagulated blood sample comprising the steps of:

(i) contacting the ante-chamber end of said apparatus with the blood sample, (ii) maintaining contact of the apparatus with the sample until the sample substantially fills the ante-chamber and the sample has begun to fill the analysis chamber (i.e. the sample has just begun to fill the analysis chamber), (iii) removing the ante-chamber end of the apparatus from contact with the sample or removing the sample from contact with the ante-chamber end of the apparatus, and (iv) allowing the sample in the ante-chamber to substantially transfer by capillary action into the analysis chamber to substantially fill the analysis chamber.

In further embodiments the present invention relates to a method of using the apparatus of the present invention for the sampling and analysis of an anti-coagulated or non-coagulated blood sample comprising the steps of:

(i) contacting the ante-chamber end of said apparatus with the blood sample, (ii) maintaining contact of the apparatus with the sample until the sample substantially fills the ante-chamber and the sample has begun to fill the analysis chamber (i.e. the sample has just begun to fill the analysis chamber), (iii) removing the ante-chamber end of the apparatus from contact with the sample or removing the sample from contact with the ante-chamber end of the apparatus, (iv) allowing the sample in the ante-chamber to substantially transfer by capillary action into the analysis chamber to substantially fill the analysis chamber, and (v) analyzing the sample in the analysis chamber by a light-based qualitative and/or quantitative analysis method.

As illustrated and discussed further below, it should be noted that in using the device it is important that the apparatus not be removed from the sample prematurely, i.e. before the analysis chamber has just begun to fill with the sample, otherwise the capillary action necessary for sub-stantially or completely filling the analysis chamber might not be sustained. Without being limited by theory, the reason for maintaining this contact until capillary flow has com-menced into the analysis chamber is because of the nature of fluid dynamics to establish the capillary flow within the analysis chamber via a continuous liquid phase between the chambers.

In further embodiments the present invention relates to a method wherein said analysis method of step (v) is a digital imaging and analysis method employing (utilizing) UV/vis-ible spectroscopy.

In further embodiments the present invention relates to a method wherein said analysis method of step (v) is a digital imaging and analysis method employing (utilizing) IR spec-troscopy.

In further embodiments the present invention relates to a method wherein said biological sample has been pre-treated with a fluorophore and said analysis method of step (v) is a digital imaging and analysis method employing (utilizing) fluorescence spectroscopy.

In further embodiments the present invention relates to a method comprising the further step (vi) of performing a digital image analysis of the results from step (v).

In further embodiments the present invention relates to a method wherein said sample has been pre-treated with a fluorophore and said analysis method of step (v) is fluores-cence microscopy.

In further embodiments the present invention relates to a method of using an apparatus of the present invention for performing a complete blood count in a microgravity envi-ronment.

In further embodiments the present invention relates to an apparatus for transferring a portion of a sample containing particles into an analysis chamber, said apparatus compris-ing:

(a) an ante-chamber, and (b) an analysis chamber, wherein the ante-chamber and the analysis chamber are:

(i) continuous with each other, (ii) wherein said ante-chamber is configured for contain-ing an amount of sample which will under-fill or substantially fill said analysis chamber, and (iii) wherein said ante-chamber is configured to be in contact with the sample with means for allowing con-tact with the sample only for as long is required to substantially-fill said ante-chamber.

In further embodiments the present invention relates to an apparatus further comprising an absorbent means for remov-ing excess sample from contact with the ante-chamber.

In further embodiments the present invention relates to a method for filling an apparatus of the present invention with a liquid sample comprising the step of rapidly filling a volumetrically equivalent but physically smaller connected ante-chamber from said sample by briefly contacting said sample to the ante-chamber and thereby allowing said analysis chamber to fill from said ante-chamber.

In further embodiments the present invention relates to an apparatus or method wherein the substantial filling of the ante-chamber takes from about 0.4 to about 3 seconds and the substantial filling of the analysis chamber takes from about 5 to about 30 seconds.

In further embodiments the present invention relates to an apparatus or method for extracting a sub-sample of whole blood for analysis from a larger parent sample without altering the concentration of particles in the sub-sample and for transferring the entirety of the sub-sample into an analysis chamber for enumeration of the particles contained within a defined volume of the sub-sample.

In further embodiments the present invention relates to an apparatus which does not comprise or depend upon an external means or external intervention to effect the transfer of the sample from the ante-chamber to the analysis cham-ber.

In further embodiments the present invention relates to an apparatus wherein said external means or external interven-tion is selected from the group consisting of a pneumatic means (such as aspiration, vacuum, or suction), pipetting, a mechanical or instrument operated transfer device, or human intervention.

These and other embodiments of the present invention will become apparent from the disclosure herein.

BRIEF DESCRIPTION OF THE DRAWINGS

In FIG. 2A the apparatus 1 is not yet in contact with the drop of blood. In FIG. 2B the blood drop is in contact with the apparatus 1. In FIG. 2C the blood drop has partially filled ante-chamber 8. In FIG. 2D the blood drop completely filled ante-chamber 8. FIG. 2E illustrates that the apparatus 1 is no longer in contact with the blood sample, i.e. the apparatus and the blood sample are removed from each other, when the ante-chamber 8 is completely filled and the blood sample has begun filling the analysis chamber 9. In FIG. 2F the blood sample has continued to flow from the ante-chamber 8 to further fill the analysis chamber 9, illustrating where both chambers are shown as being partially filled. In FIG. 2G the analysis chamber 9 is completely filled and the ante-chamber 8 is empty.

DETAILED DESCRIPTION OF THE INVENTION

Figure 1:
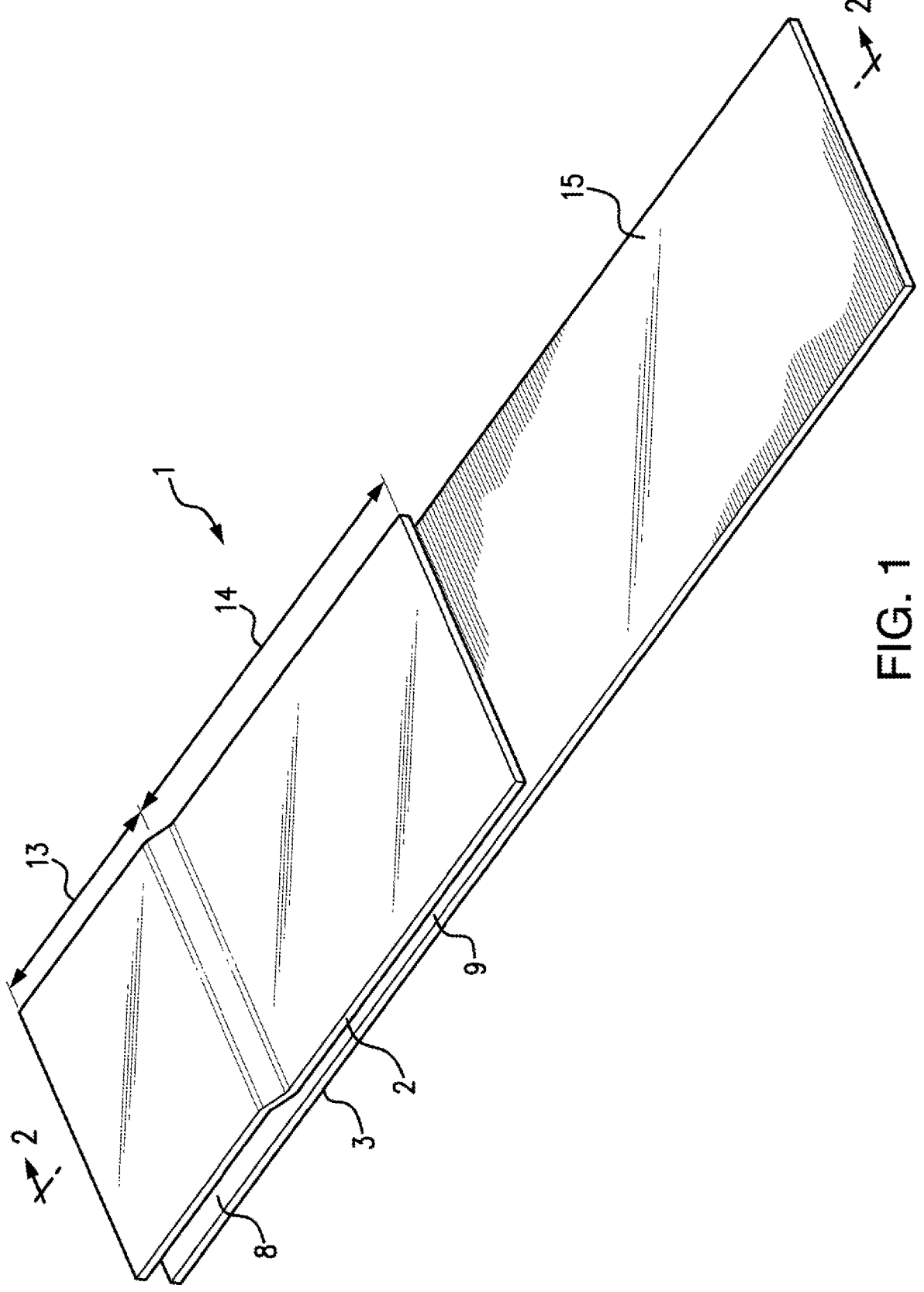
FIG. 1 is a perspective view, not to scale, of an embodiment of an apparatus of the present invention. In this view the separator elements, such as 4 and 5, or 10 and 11, are not shown.

The present invention provides an apparatus for transferring a representative sample of a liquid containing particles into a chamber for analysis. The apparatus comprises an ante-chamber configured for receiving a representative portion of said sample and subsequently transferring said portion to an analysis chamber. The present invention also relates to methods of using the apparatuses of the present invention for receiving, transferring, and analyzing biological samples, such as blood samples.

The apparatus in some embodiments is a single construct, which can be in the form of a dipstick. By a single construct is meant that the ante-chamber and analysis chamber are configured to provide direct fluid contact and capillary flow from the ante-chamber into the analysis chamber when the portion of the apparatus comprising the ante-chamber is contacted with a fluid sample of interest. Upon such contact with a fluid sample, the sample can flow rapidly and directly into the ante-chamber by capillary action and secondarily, directly into the analysis chamber by capillary action. This filling is essentially automatic and does not require other external means, such as pressure from a plunger, other device, or the application of an air flow to drive the sample from the ante-chamber into the analysis chamber. Alternatively, the apparatus does not require the application of a suction, vacuum, or aspiration means, such as from a vacuum pump, aspirator or pneumatic device to draw the sample from the antechamber into the analysis chamber. Therefore, the apparatus can function as a freestanding dipstick for both the sampling and analysis of a liquid sample without the need for a more complex construct requiring external intervention to move the liquid sample from a sampling ante-chamber into an analysis chamber.

By a "dipstick" is meant that the apparatus is designed to directly sample a fluid, such as a blood sample. This sampling is achieved by directly contacting the open, ante-chamber end of the apparatus to the sample to draw the sample into the antechamber by capillary action. This dipstick feature is a significant convenience that dispenses with the need for pipetting, pumping, or otherwise transferring the sample into the ante-chamber by such an external means. Furthermore, a larger, more complex, or expensive cartridge type of device is not required.

Once the ante-chamber is filled with the sample and has begun to flow into the analysis chamber, the apparatus is removed from contact with the sample. The sample will then continue to flow by capillary action from the ante-chamber into the analysis chamber, thereby transferring essentially all of the contents of the antechamber into the analysis chamber. Because the filling of the ante-chamber is relatively rapid compared to the filling of the analysis chamber, the ante-chamber contents are far more representative of the contents of the sample than would be achieved by attempting to directly fill the analysis chamber from the sample itself, thus facilitating accurate quantitation, e.g., the number of particles of cells per volume of fluid. The chambers are continuous with each other, configured to allow the capillary flow of substantially the entirety of the contents of the ante-chamber into the analysis chamber, to under-fill or substantially fill the analysis chamber, and configured to maintain a liquid-air interface to maintain a negative pressure within the analysis chamber with respect to the ambient atmospheric pressure, thereby assuring a positive pressure on all outer surfaces of the analysis chamber, said pressure being an essential requirement for an accurate chamber height. Without this pressure the chamber height can exceed the average height of the spacers, beads or posts separating the two planar surfaces.

The dipstick is designed for single use and can be disposed of after performing the sampling and/or analysis. This disposable feature is important for integrity, safety, and health reasons to avoid potential contamination of samples and risk of spread of infection. Also, the disposable feature obviates the need for cleaning the apparatus for reusing.

Apparatus and Methods

The apparatus of the present invention is useful for quantitating biological cells such as red blood cells or white blood cells, fragments and portions of the cells such as red cell fragments and platelets and biologically derived non-dissolved substances such as malarial parasite waste products and intact blood-borne organisms and any other biologically derived visualizable particle, hereinafter referred to as biological particles.

For example, the source of blood can be an open well mixed tube containing EDTA or other suitable anticoagulants. The sample is accessed and acquired by dipping the edge of the ante-chamber into the tube of blood and immediately removing it. The outer surfaces of the ante-chamber may be coated with a hydrophobic agent such as Fluoropel to prevent blood from adhering to its surface. The advantages to the user are that the drop of blood need not be first obtained from the tube and then accessed, thereby reducing the risk of soiling the analytical instrument or the surrounding environment. Alternatively, the sample can be acquired by directly touching the ante-chamber to a drop of blood pendant from a finger stick. In this instance, it is preferable that at least the ante-chamber contains some anticoagulant(s), such as heparin and/or EDTA to lessen the chance of the blood coagulating within the antechamber.

As discussed above, the prior art has many disadvantages for performing necessary analytical techniques such as complete blood counts. For example, prior U.S. Pat. Nos. 8,241,572 and 8,158,434 discussed above describe an apparatus and method for enumerating particle constituents in a sample of whole blood, comprising a chamber which forms a thin film of whole anti-coagulated blood. Because a liquid containing particles, such as a sample of whole blood, does not have the same flow characteristics as one which does not, i.e., plasma, this presents challenges for transferring a portion of a whole blood from a large sample container to a much smaller one, such as said thin-film chamber. It is difficult to ensure the sample transferred to the analysis space has the same concentration of constituents as the original sample because any movement of blood through a tube, particularly one of small diameter, will cause a separation of the particulates and their concentration (or reduction), depending upon the particular flow characteristics. In these cited references, the analysis chamber is of such a height that flow-induced changes in particle concentration are inevitable, if not desirable, but since all of the chamber is analyzed, local variations in composition within the chamber do not affect the final result. To accurately measure the concentration of particulates in the original sample, using this invention, requires the transfer of a very small portion (sub-microliter to a few micro-liters) of the sample from a much larger pool of sample, and to do so in a manner that does not alter the relative quantities of particulates and fluids that enter the chamber.

We have found that simply connecting the sampling chamber to the sample via simple tubing, capillary or otherwise, does not provide good results, because particulate streaming during flow changes the relative concentrations of components within the conduit as the sample reaches the chamber, and also within the chamber itself, and these changes vary with the plasma viscosity and the size and concentration of the particulates.

The present invention greatly improves upon the prior art because it provides a means for sample transfer without the need for employing expensive and delicate) mechanical means, nor does it rely upon the particular skills of the operator performing the analysis.

In the present invention, the sample needed for the actual analysis is about 0.3 to 0.4 micro-liters. The maximum capacity of the analysis chamber is about 0.4 micro-liters.

The amount of sample transferred from the ante-chamber to the analysis chamber by capillarity can vary depending upon the blood sample viscosity, but is ultimately measured after the transfer and calculated by the analysis instrument. Larger chambers can be employed for greater counting precision but the principles described herein still hold.

It is essential that the analysis chamber not be overfilled, because the subsequent loss of the capillary contained air liquid (blood) interface will eliminate the inward capillary forces exerted on the roof of the chamber. The forces are dependent on the presence of an air fluid interface in a capillary space contiguous with the analysis chamber. The persistent capillary forces on the chamber roof are needed to hold it firmly down against (in this case) exactly four-micron spacers, thereby ensuring a z-axis accuracy of one percent or 40 nanometers (which is one tenth the wavelength of blue light). The precisely known height and the geometry of the optical system would therefore permit a determination of the precise volume of the blood and the number of and size of the particles that are enumerated by the instrument. The analyses can be accomplished using a combination of fluorescence emission, optical absorption and pattern recognition. See the cited references, below, which have been incorporated by reference in their entirety.

What we previously described in the cited references is the instrument optical sensor means of determining when the chamber is almost full so that the instrument can mechanically disrupt the continuity of the chamber with the source of the blood so as to prevent over filling of the analysis chamber. However, this prior system adds complexity and cost to the instrument. Additionally, described in the cited references is a means of adding an approximate volume of blood to the chamber by either human or instrument pipetting of a volume of approximately 0.25 to 0.4 micro-liters. The sample volume added to the analysis chamber is approximate because accurate delivery of an exact amount within a desired accuracy of one percent is extremely difficult. The cited prior patents describe the delivery of a range of volumes but depend upon the instrument to determine the volume of the analyzed sample. However, this latter determination can be accurate only if the chamber is not over filled.

In the present invention, the source of the blood for analysis is either a finger stick yielding an approximate volume of one drop of blood or a pipetted drop of blood from an anticoagulated sample of blood obtained by venipuncture. This one single drop of blood contains about 30 to 50 micro liters (i.e. 3-5×10-5 liters). The volume utilized for analysis is about 300 to 400 nanoliters (i.e. 3-5×10-7 liters). It is seen that the drop source is about one hundred times the volume needed but is the smallest amount that is easily obtained. However, if the sample is too small, it may not be representative of the circulating blood composition.

When fluid is introduced within the instant invention, the walls are wetted and the fluid continues to flow into the chamber(s) through a combination of the adhesive forces of the fluid to the wall and the surface tension of the liquid. This is commonly known as 'capillary flow', and the fluid-air interface will advance, creating a negative pressure in the fluid behind it, which draws more fluid from the source. This process will continue until either the source is exhausted or the fluid-air interface reaches a barrier which constrains it. This constraint can be an impermeable wall, or a portion of the wall which is either non-wettable or at such a distance as to break the capillary forces, such as a moat or even the termination of one of the surfaces. When the fluidair interface reaches such a constraint, it is no longer drawn forward and can no longer generate negative back-pressure.

To operate properly, it is critical that the analysis chamber walls be drawn together by enough negative pressure to force contact between the walls and whatever separator means is employed. This and similar devices rely on continued capillary force-driven negative back pressure to provide this force, which in turn requires at least one fluid-air interface in the device to be unconstrained. Capillary forces always act to draw fluid into the space with the narrowest dimensions, so fluid (blood) in the ante-chamber is preferentially drawn into the analysis chamber. If the ante-chamber contains a lesser volume of fluid than the analysis chamber, the analysis chamber will completely fill, leaving no fluid remaining in the ante-chamber. Even in the event of having an 'endless' analysis chamber, fluid flow will stop when the fluid-air interface reaches the analysis chamber, since at that point the forces on the distal end match those proximally, and no flow will occur. In the event that the antechamber holds slightly more fluid than the analysis chamber, flow will stop when the analysis chamber is filled, and there will be a fluid-air interface remaining within the ante-chamber. Although not ideal, in this instance some negative back-pressure is still applied by that fluid-air interface, and the device can function.

Various embodiments of the present invention are possible. FIGS. 1 through 4 exemplify embodiments, where the apparatus is designed to function as a sampling dipstick for a liquid biological sample. FIGS. 5 through 10 illustrate embodiments where the apparatus is designed to receive liquid biological sample that is dispensed onto a receiving area of the device.

It should be noted that for the figures that the scale, spacing, and orientation of the separator elements is illustrative and not intended to be limiting.

FIG. 1 is a perspective view, not to scale, of an embodiment of an apparatus 1 of the present invention. The apparatus is designed as a single-use, disposable dipstick, for conveniently and efficiently both sampling and analyzing a liquid sample such as a blood sample. Shown is the first planar member 2 and the second planar member 3, which in this embodiment extends beyond the first planar member, to describe ascribable (capable of being written upon) area 15 by which the plate can be readily grasped. The ante-chamber 8 and analysis chamber 9 are indicated. The length of the ante-chamber 13 and analysis chamber 14 are indicated. In this view the separator elements, such as 4 and 5, or 10 and 11, are not shown. Also, optional side-walls are not shown. The reference numbers "2 with the arrow and dotted line" indicates the sectional side elevation shown in FIGS. 2 and 2A through 2G.

Figure 2:
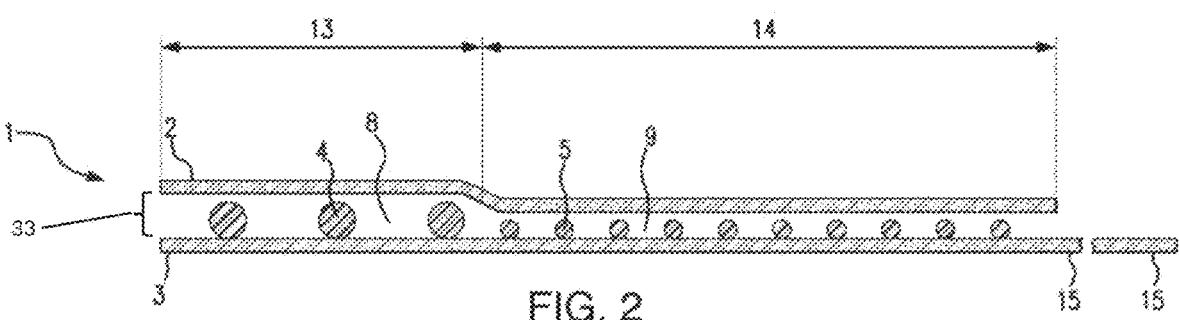
FIG. 2 is a sectional side elevation, not to scale, of the apparatus of FIG. 1, showing the first planar member 2 where it is raised from and not in contact with the spherical separator elements 4 and 5.

FIG. 2 is a sectional side elevation, not to scale, of the apparatus of FIG. 1, showing the first planar member 2 where it is raised from and not in contact with the spherical separator elements 4 and 5. The first planar member 2 is generally in this raised configuration when the apparatus is empty. As is shown in the further descriptions and figures, this first planar member 2 is drawn down to the spheres as the apparatus begins to fill with the liquid being sampled. The second planar member 3 is in contact with the spherical separator elements. The regions defining the ante-chamber 8 and the analysis chamber 9 are indicated, as well as the extension of the second planar member defining the scribable area 15. The length of the ante-chamber 13 and analysis chamber 14 are indicated. The ante-chamber 13 has an opening 33 defined at the edges of the first planar member 2 and the second planar member 3. FIG. 2B illustrates a blood drop 16 in contact with the ante-chamber opening 33. FIG. 3 illustrates the height h1 of the ante-chamber 13 at the opening 33 indicated by arrow 6.

Figure 2A:
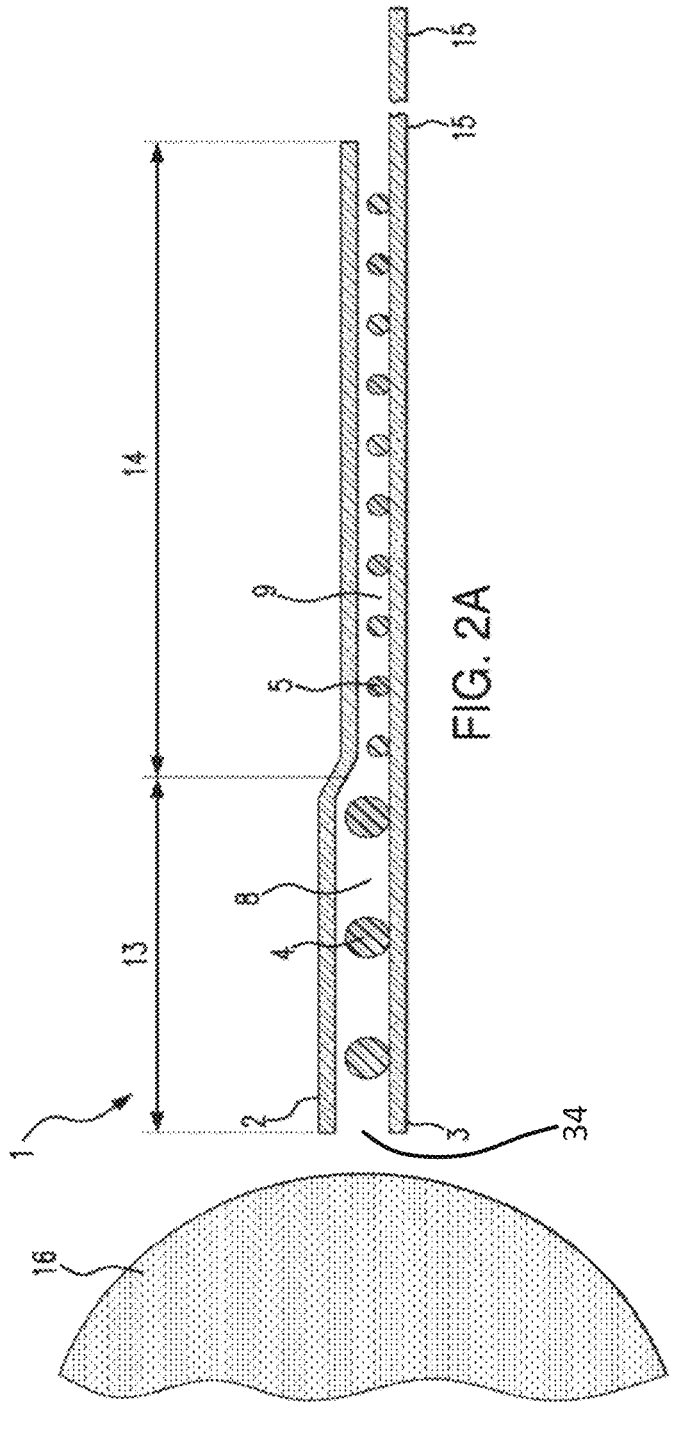
FIGS. 2A through 2G are sectional side elevations, not to scale, illustrating the use of the apparatus of FIGS. 1 and 2 for sampling a liquid such as a drop of blood 16.
Figure 2B:
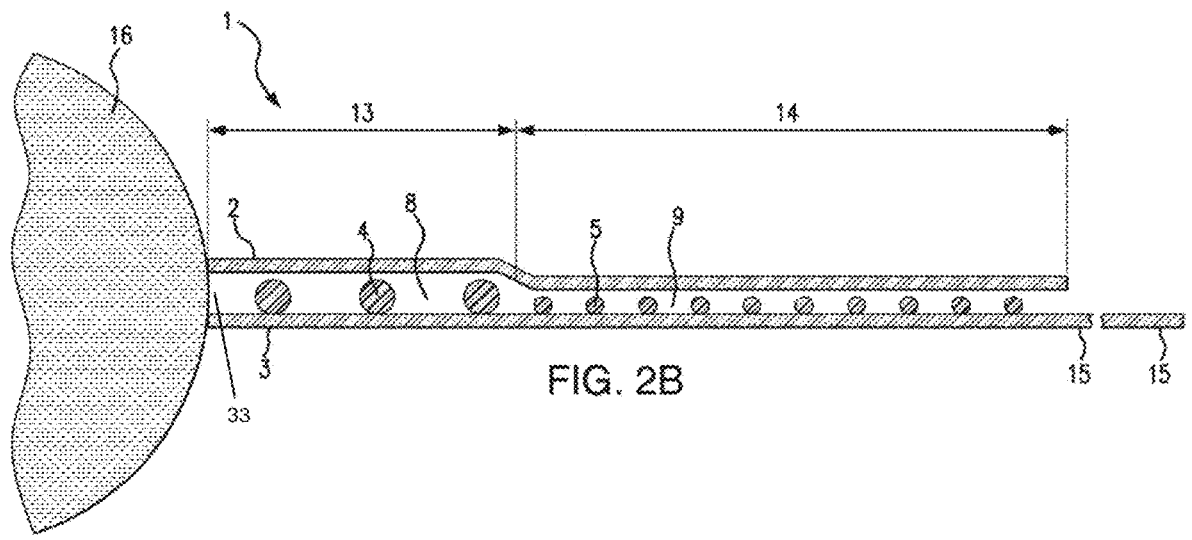

FIGS. 2A through 2G are sectional side elevations, not to scale, illustrating the use of the apparatus of FIGS. 1 and 2 for sampling a liquid such as a drop of blood 16. In FIG. 2A, the apparatus 1 is not yet in contact with the drop of blood 16. When using the apparatus 1, it can either be contacted with the blood sample or the blood sample can be brought in contact with the apparatus 1. It should be noted that both the proximal end of the apparatus, i.e of the proximal end of the ante-chamber, with respect to the drop of blood 16, and the distal end of the apparatus, i.e. where the top planar member 2 terminates are both open to the surroundings.

FIG. 2B illustrates the situation where the blood drop 16 is in contact with the apparatus 1., but has not entered the apparatus, i.e. the proximal end of the apparatus/ante-chamber. As stated above, either the apparatus can be contacted with the blood or the blood can be contacted with the apparatus.

Figure 2C:
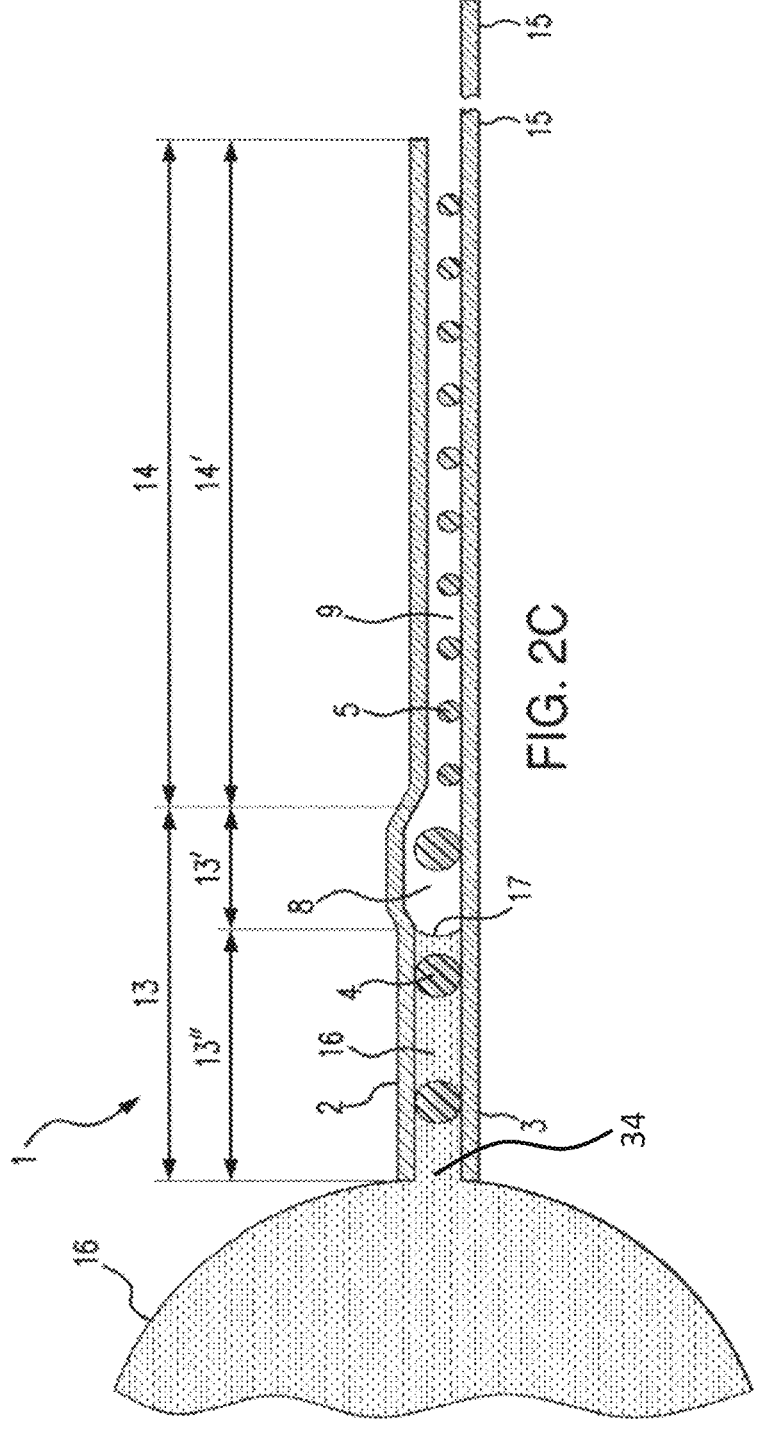
Figure 3:
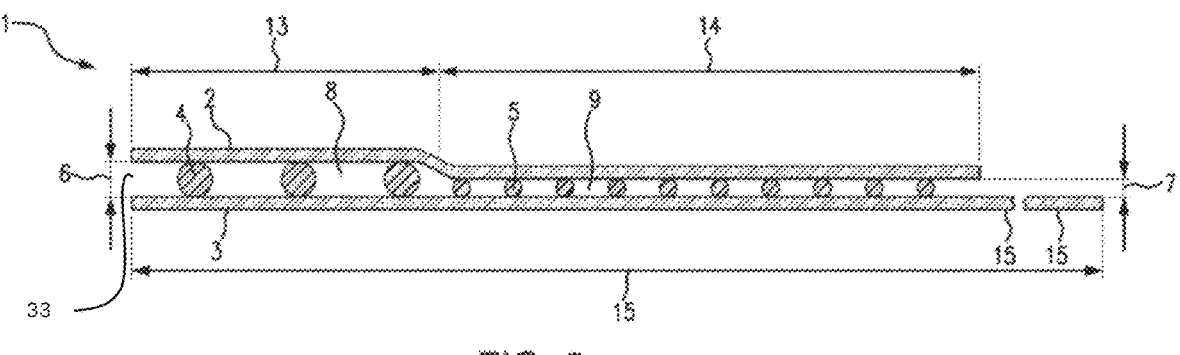
FIG. 3 is a sectional side elevation, not to scale, of the apparatus of FIGS. 1 and 2, showing the first planar member 2 where it is in contact with the spherical separator elements 4 and 5.

In FIG. 2C the blood drop 16 has partially filled ante-chamber 8. Two regions of the length of the antechamber 13 are defined as the filled region of the antechamber 13", and the unfilled region 13'. Due to the relatively small dimension of the chambers and the high surface tension of most biological samples, the sample would be drawn into the apparatus by capillary action. Because the analysis chamber has not been filled, its total length 14 is indicated as unfilled 14'. Note that the portion of the first planar member 2 that is in contact with the blood sample 16 is drawn down upon in contact with those spheres. Within the length of the ante-chamber 13, the length of the region of the first planar member 2 that is in contact with the spheres is defined by 13". The remaining length of the first planar member 2 defining the ante-chamber that is not in contact with the blood sample 16 remains separated from the spheres until the blood sample is drawn into that portion of the first planar member, and is then defined as 13'. Note the meniscus 17 that would form at the interface between the blood sample and the air.

Figure 2D:
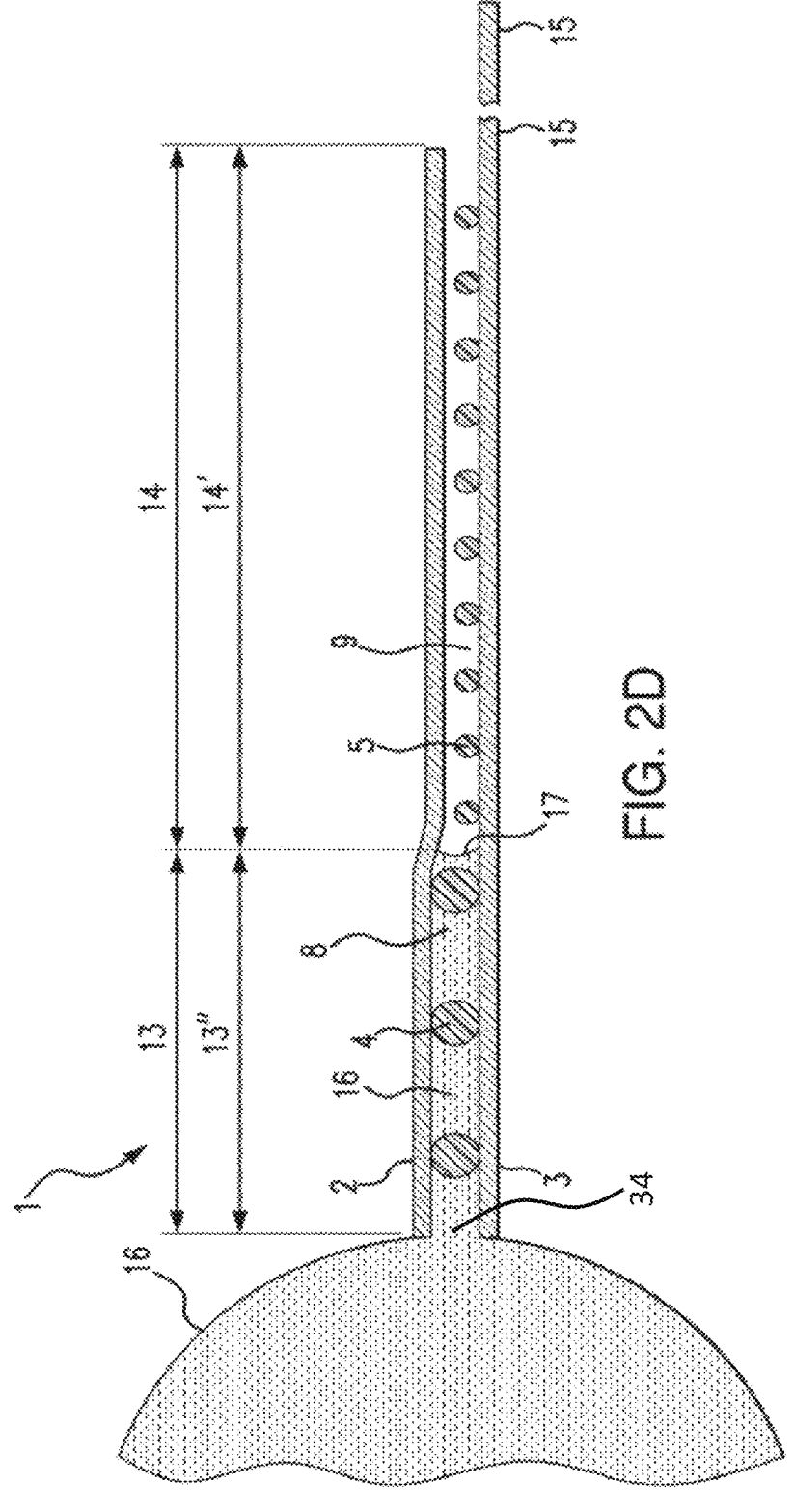

In FIG. 2D the blood drop completely filled ante-chamber 8. Note that the meniscus 17 is located approximately at the junction between the ante-chamber 8 and the analysis chamber 9, which has not yet begun filling with the blood sample. It should also be noted that the first planar member 2 is in contact with all of the spheres in the ante-chamber to now accurately define the dimensional volume of the antechamber. The length of the antechamber 13 is completely filled and denoted as 13". Because the analysis chamber has not been filled, its total length 14 is indicated as unfilled 14'. It should be noted that the portion of the first planar member 2 defining the analysis chamber is not in contact with any of the spheres. Visualization of this point where the ante-chamber is completely filled can be facilitated for colored samples such as blood if the portion of the second planar member comprising the ante-chamber further comprises a white or other light-colored opaque coating or backing.

Figure 2E:
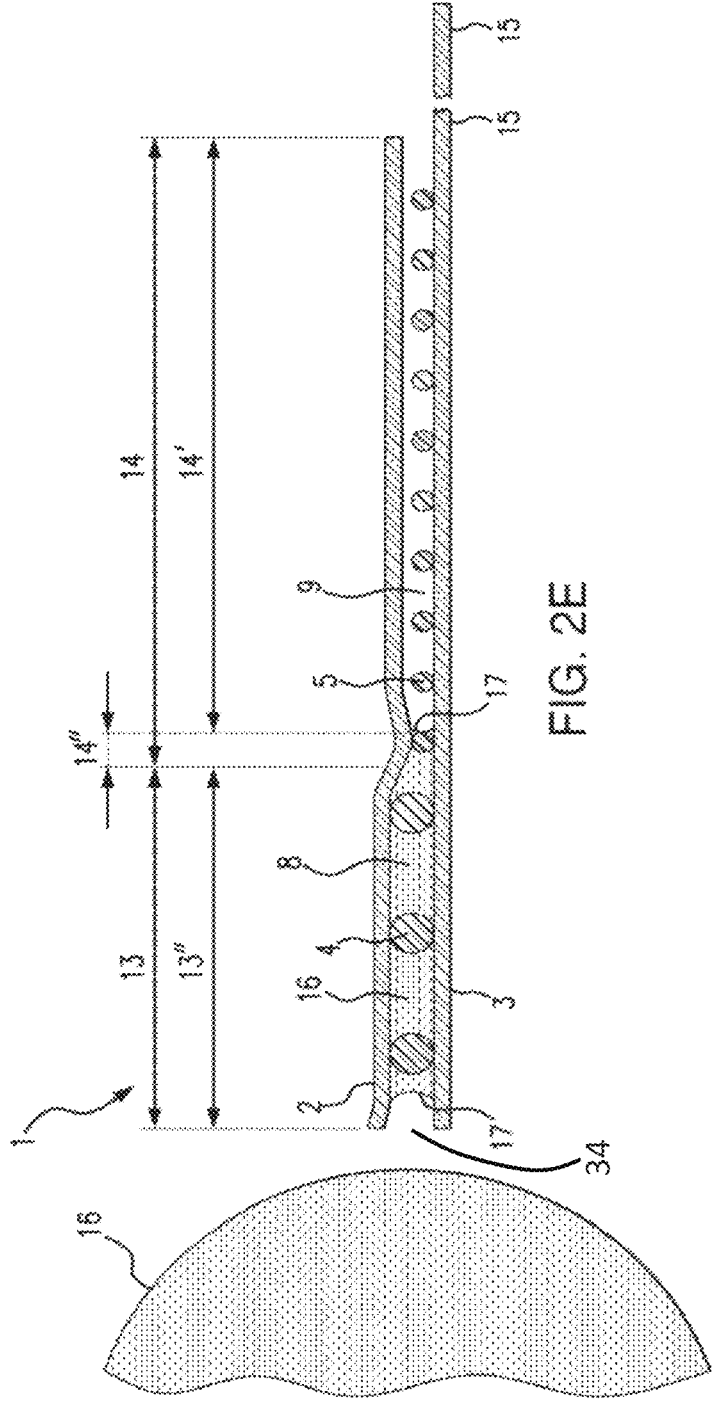

FIG. 2E illustrates that the apparatus 1 and the blood sample 16 should no longer be in contact with each other once the ante-chamber 8 is completely filled, and the analysis chamber 9 has just begun to fill. As just described above, either the apparatus is withdrawn from the blood sample or the blood sample is withdrawn from the apparatus. Also, it should be noted that the first planar member 2 is in contact with all of the spheres in the ante-chamber, and the blood sample has just begun to enter the analysis chamber and the first planar member 2 is beginning to be drawn down over the first small bead in the area filled with the blood sample. Also, there is now a meniscus 17 at both ends of the sample: one at the open end 34 of the ante-chamber and one at the beginning of the analysis chamber where the sample has just begun to fill the analysis chamber. It should be noted that in using the device it is important that the apparatus not be removed from the sample prematurely, i.e. before the analysis chamber has just begun to fill with the sample, otherwise the capillary action necessary for substantially or completely filling the analysis chamber might not be sustained.

Figure 2F:
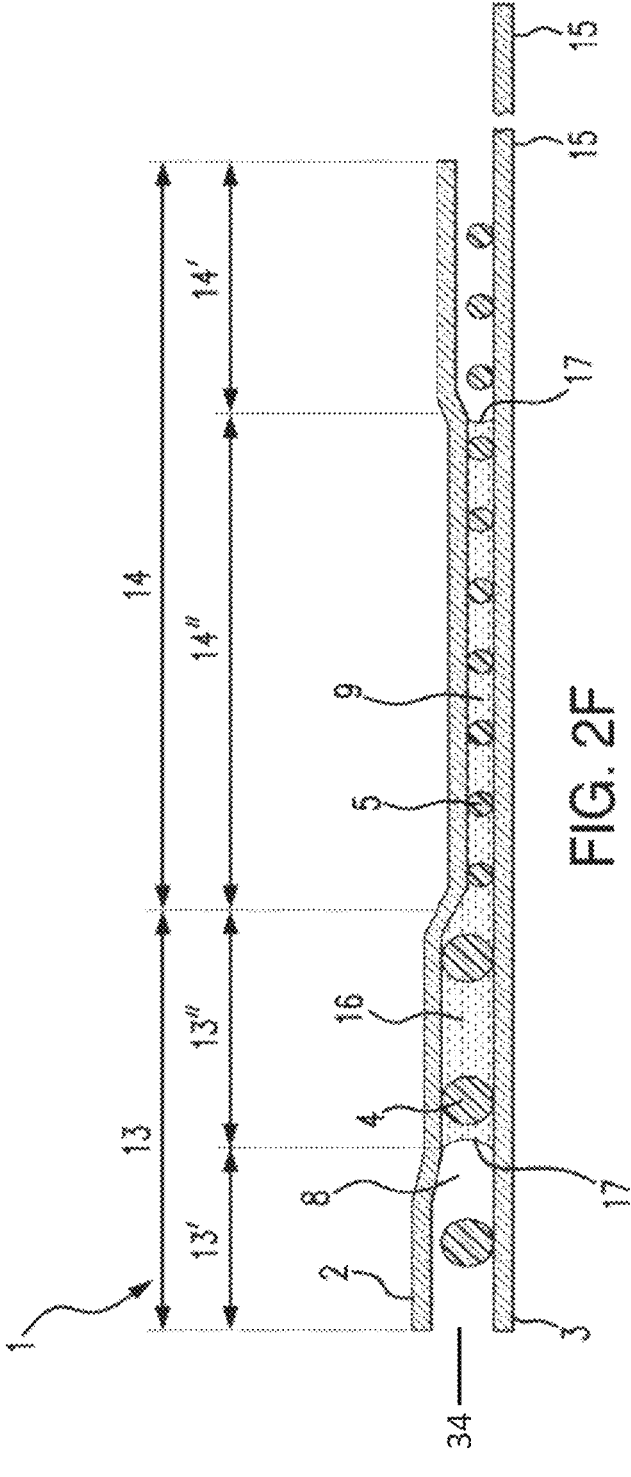

FIG. 2F illustrates a point where a portion of the blood sample has flowed from ante-chamber 8 to into the analysis chamber 9 by capillary action. Two regions of the length of the ante-chamber 13 are defined as the filled region of the ante-chamber 13", and the unfilled region 13'. Likewise, two regions of the length of the analysis chamber 14 are defined as the filled region of the analysis 14", and the unfilled region 14'. Note that the first planar member 2 is in contact with those spheres of both the ante-chamber and the analysis chamber in those regions containing the blood sample 16, i.e. the filled regions. Within the length of the ante-chamber 13, the length of the region of the first planar member 2 that is in contact with the spheres is equivalent to the length of the filled region of the ante-chamber 13". Likewise, within the length of the analysis chamber 14, the length of the region of the first planar member 2 that is in contact with the spheres is equivalent to the length of the filled region of the analysis chamber 14". Within the length of the ante-chamber 13, the length of the region of the first planar member 2 that is not in contact with the spheres is equivalent to the length of the unfilled region of the ante-chamber 13'. Likewise, within the length of the analysis chamber 14, the length of the region of the first planar member 2 that is not in contact with the spheres is equivalent to the length of the unfilled region of the analysis chamber 14' Note also that the meniscus 17 at each end of the sample defines the boundaries of the sample.

Figure 2G:
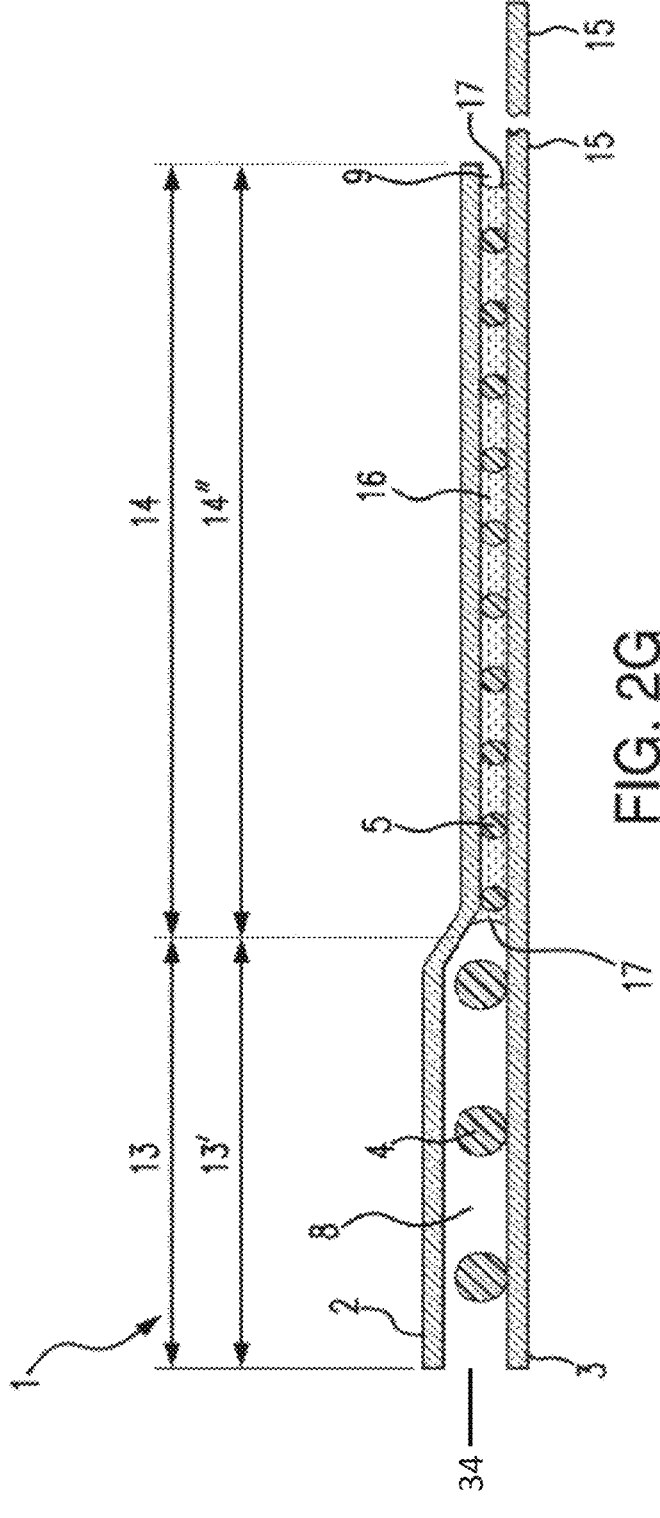

FIG. 2G illustrates the point where the analysis chamber 9 is substantially or completely filled with the sample 16 and the ante-chamber 8 is empty. Because the analysis chamber is completely filled, its total length 14 is indicated as filled 14". Because the ante-chamber is now unfilled, its total length 13 is indicated as unfilled 13'. Note that the first planar member 2 is no longer drawn down and in contact with the spheres in the ante-chamber, i.e. the first planar member has returned to its initial position in the region of the length of the unfilled ante-chamber defined by 13'. However, the region of the first planar member 2 defining the analysis chamber is now in contact with the spheres in the analysis chamber in the region of length of the filled analysis chamber defined by 14". The analysis chamber now defines a volume based on the dimensions provided by the diameter of the spheres 5 and the length and width of the chamber. Therefore, it is seen that the apparatus and methods of the present invention provide a means for accurately filling an analysis chamber with a biological sample such as non-coagulated or anti-coagulated blood.

FIG. 3 is a sectional side elevation, not to scale, of the apparatus of FIGS. 1, 2, 2A through 2G, showing the first planar member 2 where it is in contact with the spherical separator elements 4 and 5. The overall length of the device is shown by the arrow 15. The length of the ante-chamber 13 and analysis chamber 14 are indicated. The height of the ante-chamber is shown by the arrows for 6 (defined by h1) and corresponds to the diameter of the spherical separator elements 4. The height of the analysis chamber is shown by the arrows for 7 (defined by h2) and corresponds to the diameter of the spherical separator elements 5. The width of the apparatus is not shown in this sectional view. By varying the width of the apparatus, the length of the ante-chamber, the length of the analysis chamber, and the diameter of the spherical elements 4 and 5, various volume dimensions for the ante-chamber and analysis chamber can be achieved. For example, the ratio of h1 to h2 can be selected from about 1.5 to 15. Some useful dimensions for the ante-chamber are: from about 0.5 mm to about 5 mm wide, from about 1 mm to about 10 mm long and from about 0.002 mm (2 microns) to about 0.1 mm (100 microns) high, a nonlimiting example of which is 2 mm wide, 3 mm long, and 0.05 mm (50 microns) high. Some useful dimensions for the analysis chamber are: from about 1 mm to about 10 mm wide, from about 1 mm to about 20 mm long and from about 0.001 mm (1 microns) to about 0.010 mm (10 microns) high, a nonlimiting example of which is 8 mm wide, 10 mm long, and 0.004 mm (4 microns) high. The ante-chamber should have a volume of about 80% to about 90% of the volume of the analysis chamber. In some embodiments the ante-chamber has a volume of about 0.16 to about 0.9 microliters and the analysis chamber has a volume of about 0.2 to about 1 microliters.

Figure 4:
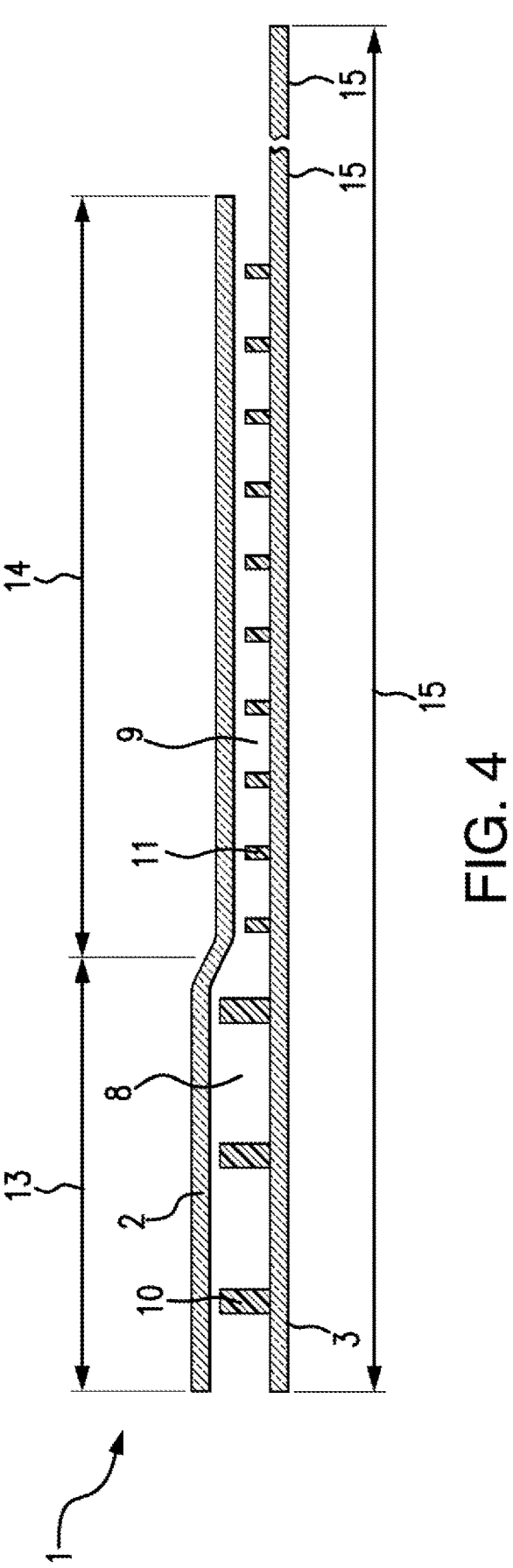
FIG. 4 is a sectional side elevation, not to scale, of the apparatus of FIG. 1, showing the first planar member 2 where it is raised from and not in contact with alternative separator elements 10 and 11 in the form of parallelepipeds or circular columns.

FIG. 4 is a sectional side elevation, not to scale, of the apparatus of FIG. 1, showing the first planar member 2 with alternative separator elements 10 and 11 in the form of parallelepipeds or circular columns. Note that in this sectional view that a parallelepiped or a circular column would have similar sectional profiles, depending on where the sectional profile is taken and the positioning and orientation of the separator spacers.

Figure 5:
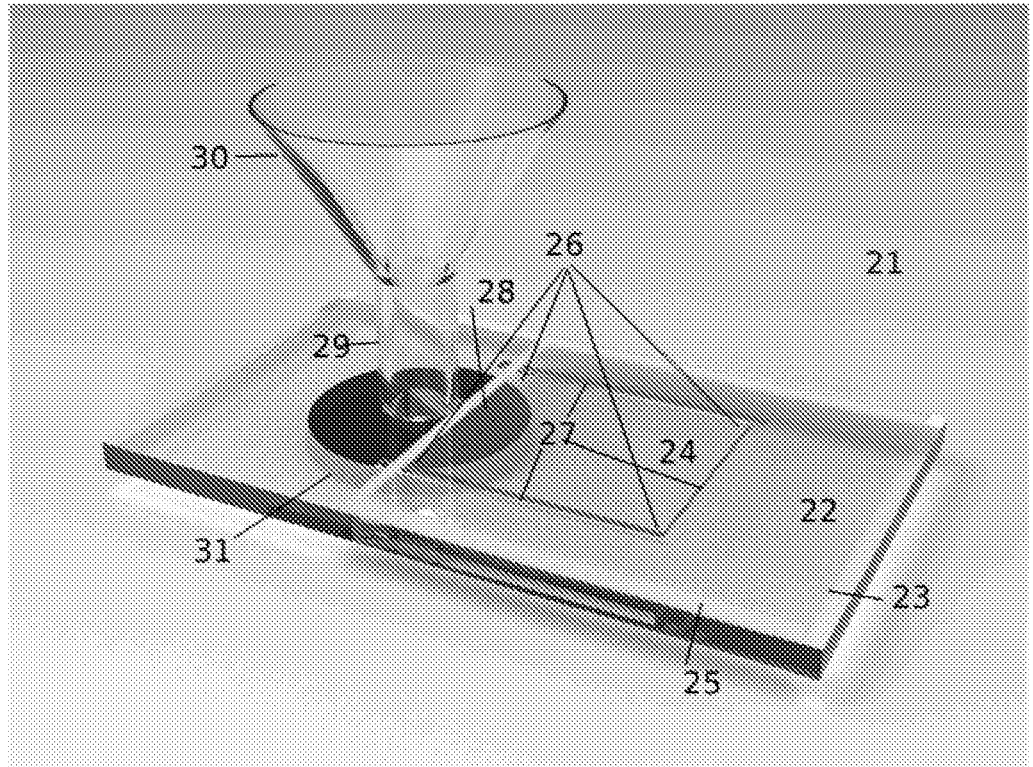
FIG. 5 shows an alternative embodiment, not to scale, of a disposable analysis chamber 21.

FIG. 5 shows a particular embodiment of a disposable analysis chamber 1 as described in U.S. Pat. No. 8,241,572, to Wardlaw, issued Aug. 14, 2012, where 22 is the based formed from a preferably transparent material such as plastic, 23 is a conforming thin film cover, and 24 are separator means previously described in the '572 patent. The conforming film, e, is preferably held in position by glue lines 25, and the area to be analyzed 26 is defined by a moat-like depression 27, which blocks capillary flow between film 23 and base 22. Note that making the base non-wettable in those locations 27 would also serve the same purpose. Base 22 has a preferably wedge-shaped depression 28 formed into it, which is continuous with the analysis section 26 of the chamber with a tubular sample transfer tube 29 which is fed by a sample receptor 30 and which is terminated, preferably by an absorbent means 31. The wedge and all connections communicating to tube 29, terminated preferably by absorbent means 31. The wedge and all connections communicating to tube 29, also referred to as the ante-chamber, are sized so as to contain the amount required to fill the volume defined by the analysis area 26 and the height of the chamber as created by the separating means 24, or slightly less. To avoid flow-related distortion of the sample particulate concentrations, the length of the passageways should be as short as practicable and the passages as large as possible.

Figure 6:
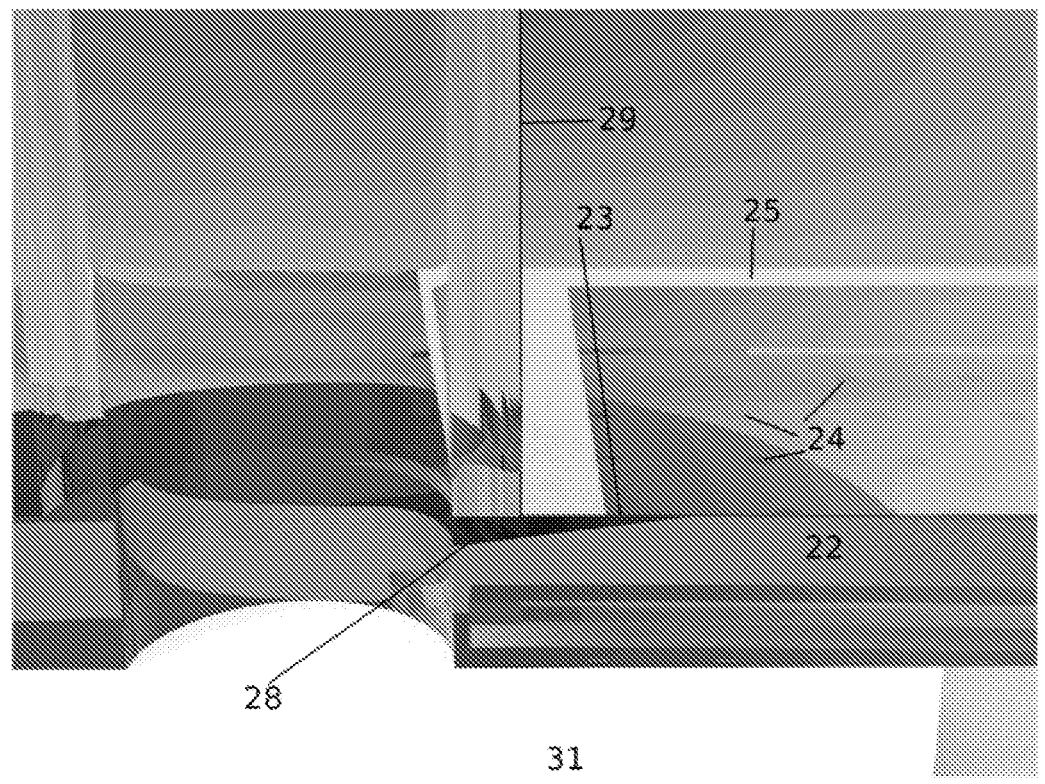
FIG. 6 is a cross-sectional view, not to scale, of the analysis chamber of FIG. 5 emphasizing the depression 28 and its communication to the sample transfer tube 29.
Figure 10:
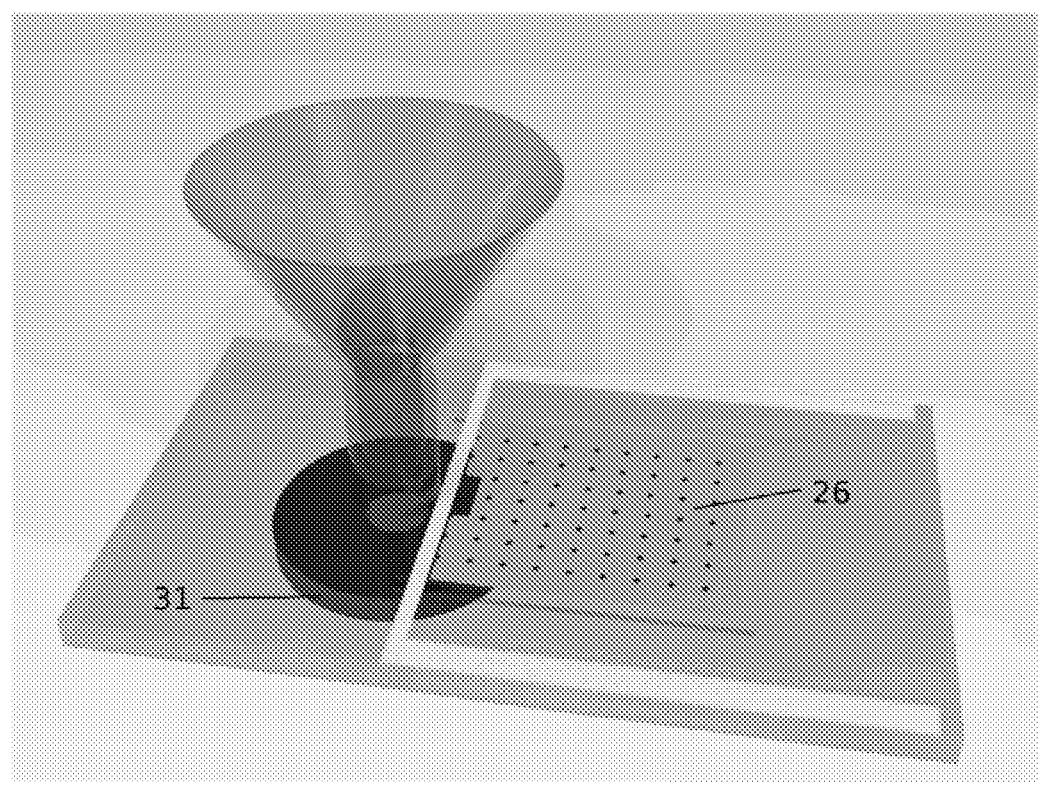
FIG. 10, not to scale, shows analysis chamber 26 filled with the sample.

FIG. 6 is a cross-sectional view of the analysis chamber of FIG. 10 emphasizing the depression 28 and its communication to the sample transfer tube 29.

Figure 7:
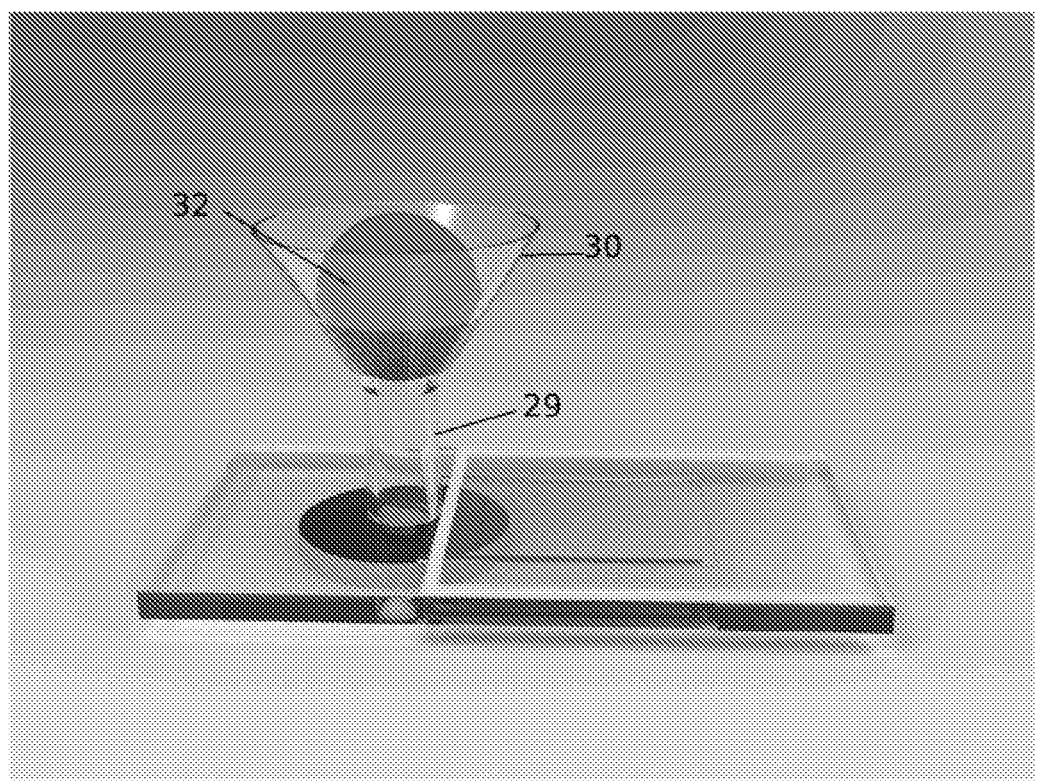
FIG. 7, not to scale, shows a sample of blood being added to receptor 30 of the analysis chamber of FIG. 5.

FIG. 7 shows a sample of blood being added to receptor 30. The sample can be a drop directly from a capillary puncture or from a larger anti-coagulated sample of venous blood.

Figure 8:
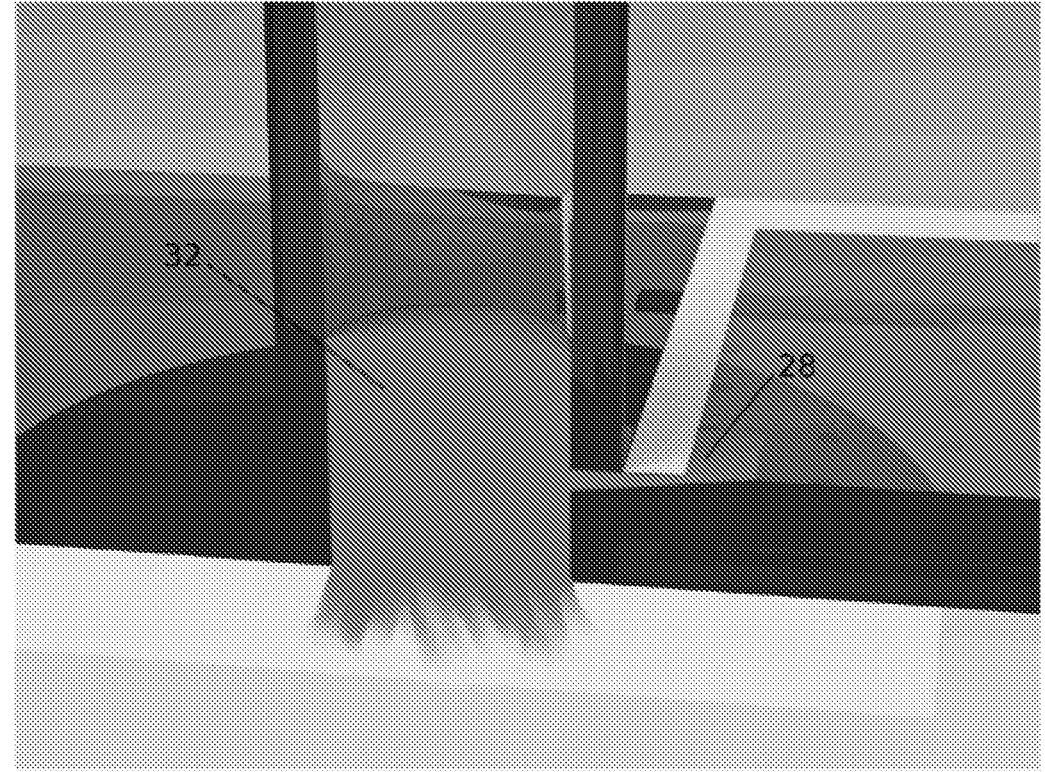
FIG. 8, not to scale, shows the blood sample 12 flowing via gravity down tube 9 on an absorbing means 31.

FIG. 8 shows the blood sample 32 flowing via gravity down tube 29 on an absorbing means 31, where it is also in contact with one end of depression 28 and which quickly fills with a small portion of the sample. A practical sample required by the analysis chamber is typically about 0.3 microliters, and sample drop 32 is typically from about 15-50 microliters.

Figure 9:
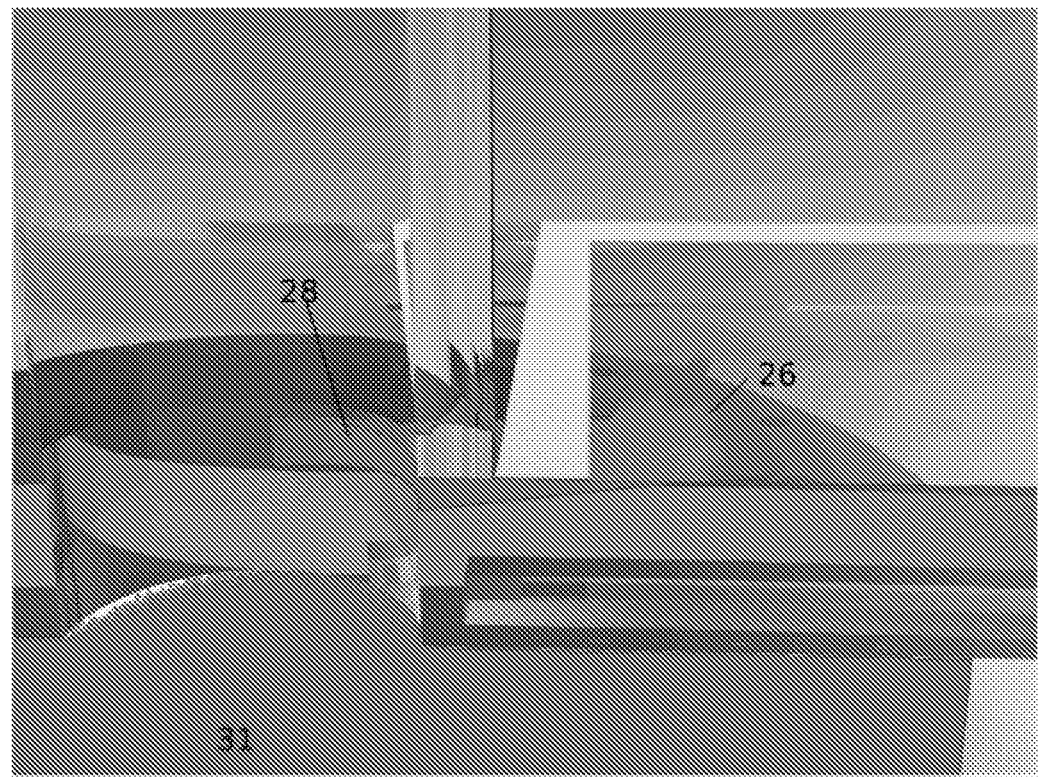
FIG. 9, not to scale, shows that the depression is filled.

FIG. 9 shows that the depression fills almost instantly. However, the flow from the depression into the analysis space 26 is relatively slow, which gives time for absorbent means 31 to draw off the remainder of the blood as shown. Note that the excess sample could also simply flow by the opening into depression 28 and into as waste pool. However, it could be preferable for the sample to have a more controlled contact to depression 28, and there is an additional advantage having the residual blood being in a non-spillable state.

FIG. 10 shows analysis chamber 26 filled with the sample. It is then analyzed as described by the cited patents. Because there is no spillable liquid blood in the disposable, it can then be more safely handled and discarded.

Materials and Use

Regarding the apparatus, various plastics and polymers that are readily available can be employed, with the major considerations being appropriate flexibility, transparency of the analysis chamber for the desired analytical method, and surface properties to allow for appropriate capillary flow of the biological fluid.

Regarding the planar members, transparent wettable plastic films or molded materials can be used such as polyethylene terephthalate, biaxially-oriented polyethylene terephthalate (Mylar), polycarbonate, polyolefins such as polyethylene and polypropylene, polyethylene copolymers (COP), acrylic acid and acrylic acid ester copolymers, and the like. Particularly useful are polyethylenes and polycarbonates.

Regarding the separator elements, a wide variety of shapes and sizes can be utilized to provide a useful applicator device. Non-limiting examples of separator elements are selected from the group consisting of spheres, parallel-epipeds (i.e. three-dimensional rectangular or square geometric shapes), circular columns, and other shapes such as I-beams. FIGS. 2, 2A through 2G, 3, and 4 illustrate representative separator elements, such as spheres 4 and 5, and parallelepipeds or circular columns such as 10 and 11. The separator elements are relatively small. For example, a useful dimension is to utilize separator elements that provide a separation between the first and second planar members (when in contact with the separator elements) for the analysis chamber of about 4 microns, and a separation for the ante-chamber of about 1.5 to 15 times greater. A plurality of separator elements would be utilized for each chamber to provide the desired dimensional spacing and structural support between the planar members, both when empty and when filled with a biological fluid.

Now referring to FIGS. 2, 2A through 2G, 3 and 4, a plurality of separator elements are disposable between the planar members 1 and 2, operable to space the planar members apart from one another (not to scale and illustrating a only a portion of the separator elements that can be employed). The dimensions of the height, when the planar members 1 and 2 are in contact with the separator elements is illustrated by h1 and h2 and correspond to the diameters of the spheres 4 and 5 or the heights of the parallelepipeds or circular columns 10 and 11. The dimensions of the separators do not equal one another exactly (e.g., manufacturing tolerances), but are within commercially acceptable tolerance for spacing means used in similar analysis apparatuses. Spherical beads are an example of an acceptable separator 4 and 5 and are commercially available from, for example, Bangs Laboratories of Fishers, Ind., U.S.A.

Although small local regions of the chambers may deviate from the desired chamber height h1 and h2, the average height h1 and h2 will be very close to that of the mean separator element dimension. Analysis indicates that the mean chamber height can be controlled to about one percent (1%) or better at chamber heights of less than four microns using this embodiment.

Subject to the flexibility characteristics (as well as other factors such as the distribution density of the separators), the separator elements can be made from a variety of materials, provided the analysis chamber 9 is sufficiently transparent. Transparent plastic films consisting of acrylic or polystyrene are examples of acceptable planar members, and separator elements made of polystyrene, polycarbonate, silicone, and the like, are acceptable. A specific example of an acceptable separator is spheres made of polystyrene that are commercially available, for example, from Thermo Scientific of Fremont, Calif., U.S.A., catalogue no. 4204A, in four-micron (4. μm) diameter. See U.S. Pat. No. 8,994,930, to Levine et al., issued Mar. 31, 2015, which is incorporated by reference herein in its entirety.

The instructions for use of some of the embodiments would be to dip the antechamber end of the apparatus into a blood sample just until the white backing is fully submerged and immediately remove it. This same backing used for viewing the filling from the drop through the top side of the strip. The backing is also utilized to show how deep to insert the apparatus (about 5 mm) and this action will result in about one second fill time.

In another iteration the invention can be used to directly sample anti-coagulated venous blood. The scribable surface serves as a handle so that the acquisition edge of the ante-chamber may be easily inserted about a millimeter beneath the surface of the well mixed blood and immediately withdrawn. The insertion is only deep enough so that only the edge of the white backing of the ante-chamber is completely submerged.

The outside surface of at least the ante-chamber is coated with a hydrophobic coating, such as FluoroPel (a hydrophobic and olcophobic coating composed of perfluoroalkyl copolymers) or other suitable hydrophobic coatings on all edges except the acquisition end of ante-chamber enabling the iteration described to be used as easily as using a urinary dipstick, although the insertion is limited to only the first approximately one millimeter.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

Furthermore, in addition to those references cited above, the following references are incorporated by reference herein in their entirety:

| US Patent No. | Issue Date | Inventor(s) |
|---|---|---|
| 3,447,863 | 1969 Jun. 3 | Patterson |
| 3,883,247 | 1975 May 13 | Adams |
| 3,895,661 | 1975 Jul. 22 | Praglin et al. |
| 3,916,205 | 1975 Oct. 28 | Kleinerman |
| 3,925,166 | 1975 Dec. 9 | Blume |
| 4,088,448 | 1978 May 9 | Lilja et al. |

-continued

| 4,171,866 | 1979 Oct. 23 | Tolles |
| 4,264,560 | 1981 Apr. 28 | Natelson |
| 4,427,294 | 1984 Jan. 24 | Nardo |
| 4,550,417 | 1985 Oct. 29 | Nungaki et al. |
| 4,558,014 | 1985 Dec. 10 | Hirschfeld et al. |
| 4,596,035 | 1986 Jun. 17 | Gershman et al. |
| 4,596,829 | 1986 Jun. 24 | Takaya et al. |
| 4,689,307 | 1987 Aug. 25 | Schwartz |
| 4,790,640 | 1988 Dec. 13 | Nason |
| 4,853,210 | 1989 Aug. 1 | Kass |
| 4,902,624 | 1990 Feb. 20 | Columbus et al. |
| 4,911,782 | 1990 Mar. 27 | Brown |
| 4,950,455 | 1990 Aug. 21 | Smith |
| 5,028,529 | 1991 Jul. 2 | Ericcson et al. |
| 5,096,669 | 1992 Mar. 17 | Lauks et al. |
| 5,122,284 | 1992 Jun. 16 | Braynin et al. |
| 5,132,097 | 1992 Jul. 21 | Van Deusen et al. |
| 5,169,601 | 1992 Dec. 8 | Ohta et al. |
| 5,184,188 | 1993 Feb. 2 | Bull et al. |
| 5,223,219 | 1993 Jun. 29 | Subramanian et al. |
| 5,275,951 | 1994 Jan. 4 | Chow et al. |
| 5,281,540 | 1994 Jan. 25 | Merkh et al. |
| 5,316,952 | 1994 May 31 | Brimhall |
| 5,362,648 | 1994 Nov. 8 | Koreyasu et al. |
| 5,376,252 | 1994 Dec. 27 | Ekstrom et al. |
| 5,397,479 | 1995 Mar. 14 | Kass et al. |
| 5,427,959 | 1995 Jun. 27 | Nishimura et al. |
| 5,431,880 | 1995 Jul. 11 | Kramer |
| 5,472,671 | 1995 Dec. 5 | Nilsson et al. |
| 5,482,829 | 1996 Jan. 9 | Kass et al. |
| 5,503,803 | 1996 Apr. 2 | Brown |
| 5,538,691 | 1996 Jul. 23 | Tosa et al. |
| 5,547,849 | 1996 Aug. 20 | Baer et al. |
| 5,585,246 | 1996 Dec. 17 | Dubrow et al. |
| 5,591,403 | 1997 Jan. 7 | Gavin et al. |
| 5,608,519 | 1997 Mar. 4 | Gourley et al. |
| 5,623,415 | 1997 Apr. 22 | O'Bryan et al. |
| 5,627,041 | 1997 May 6 | Shartle |
| 5,638,828 | 1997 Jun. 17 | Lauks et al. |
| 5,641,458 | 1997 Jun. 24 | Shockley et al. |
| 5,646,046 | 1997 Jul. 8 | Fischer et al. |
| 5,674,457 | 1997 Oct. 8 | Williamsson et al. |
| 5,681,529 | 1997 Oct. 28 | Taguchi et al. |
| 5,768,407 | 1998 Jul. 14 | Shen et al. |
| 5,781,303 | 1998 Jul. 14 | Berndt |
| 5,787,189 | 1998 Jul. 28 | Lee et al. |
| 5,800,781 | 1998 Sep. 1 | Gavin et al. |
| 5,879,628 | 1999 Mar. 9 | Ridgeway et al. |
| 5,912,134 | 1999 Jun. 15 | Shartle |
| 5,939,326 | 1999 Aug. 17 | Chupp et al. |
| 5,948,686 | 1999 Sep. 7 | Wardlaw |
| 5,968,453 | 1999 Oct. 19 | Shugart |
| 5,985,218 | 1999 Nov. 16 | Goodale |
| 6,004,821 | 1999 Dec. 21 | Levine et al. |
| 6,016,367 | 2000 Jan. 18 | Benedetti et al. |
| 6,016,712 | 2000 Jan. 25 | Warden et al. |
| 6,022,734 | 2000 Feb. 8 | Wardlaw |
| 6,106,778 | 2000 Aug. 22 | Oku et al. |
| 6,130,098 | 2000 Oct. 10 | Handique et al. |
| 6,150,178 | 2000 Nov. 21 | Cesarczyk et al. |
| 6,176,962 | 2001 Jan. 23 | Soan et al. |
| 6,188,474 | 2001 Feb. 13 | Dussault et al. |
| 6,235,536 | 2001 May 22 | Wardlaw |
| 6,261,519 | 2001 Jul. 17 | Harding et al. |
| 6,350,613 | 2002 Feb. 26 | Wardlaw et al. |
| 6,365,111 | 2002 Apr. 2 | Bass |
| 6,395,232 | 2002 May 28 | McBride |
| 6,420,114 | 2002 Jul. 16 | Bedilion et al. |
| 6,448,090 | 2002 Sep. 10 | McBride |
| 6,468,807 | 2002 Oct. 22 | Svensson et al. |
| 6,521,182 | 2003 Feb. 18 | Shartle et al. |
| 6,537,501 | 2003 Mar. 25 | Holl et al. |
| 6,544,793 | 2003 Apr. 8 | Berndt |
| 6,551,554 | 2003 Apr. 22 | Vermeiden et al. |
| 6,573,988 | 2003 Jun. 3 | Thomesen et al. |
| 6,576,194 | 2003 Jun. 10 | Holl et al. |
| 6,597,438 | 2003 Jul. 22 | Cabuz et al. |
| 6,613,286 | 2003 Sep. 2 | Braun et al. |
| 6,623,701 | 2003 Sep. 23 | Eichele et al. |

-continued

| 6,656,431 | 2003 Dec. 2 | Holl et al. |
| 6,712,925 | 2004 Mar. 30 | Holl et al. |
| 6,723,290 | 2004 Apr. 20 | Wardlaw |
| 6,766,817 | 2004 Jul. 27 | da Silva |
| 6,783,736 | 2004 Aug. 31 | Taylor et al. |
| 6,838,055 | 2005 Jan. 4 | Sando et al. |
| 6,852,284 | 2005 Feb. 8 | Holl et al. |
| 6,866,675 | 2005 Mar. 15 | Perez et al. |
| 6,866,823 | 2005 Mar. 15 | Wardlaw |
| 6,869,570 | 2005 Mar. 22 | Wardlaw |
| 6,929,953 | 2005 Aug. 16 | Wardlaw |
| 6,974,692 | 2005 Dec. 13 | Chang |
| 7,000,330 | 2006 Feb. 21 | Schwitchtenberg et al. |
| 7,010,391 | 2006 Mar. 7 | Handique et al. |
| 7,220,593 | 2007 May 22 | Haubert et al. |
| 7,226,562 | 2007 Jun. 5 | Holl et al. |
| 7,277,166 | 2007 Oct. 2 | Padmanabhan et al. |
| 7,329,538 | 2008 Feb. 12 | Wainwright et al. |
| 7,351,379 | 2008 Apr. 1 | Schleifer |
| 7,364,699 | 2008 Apr. 29 | Charlton |
| 7,381,374 | 2008 Jun. 3 | Tsai et al. |
| 7,459,125 | 2008 Dec. 2 | Stankov et al. |
| 7,468,160 | 2008 Dec. 23 | Thompson et al. |
| 7,641,856 | 2010 Jan. 5 | Padmanachan et al. |
| 7,671,974 | 2010 Mar. 2 | O'Mahony et al. |
| 7,723,099 | 2010 May 25 | Miller et al. |
| 7,731,901 | 2010 Jun. 8 | Wardlaw |
| 7,738,094 | 2010 Jun. 15 | Goldberg |
| 7,744,819 | 2010 Jun. 29 | Berndtsson et al. |
| 7,794,669 | 2010 Sep. 14 | Gyonouchi et al. |
| 7,802,467 | 2010 Sep. 28 | Wang |
| 7,850,916 | 2010 Dec. 14 | Wardlaw |
| 7,871,813 | 2011 Jan. 18 | Wyatt et al. |
| 7,903,241 | 2011 Mar. 8 | Wardlaw et al. |
| 7,929,121 | 2011 Apr. 19 | Wardlaw et al. |
| 7,929,122 | 2011 Apr. 19 | Wardlaw et al. |
| 7,951,337 | 2011 May 31 | Vollert |
| 7,951,599 | 2011 May 31 | Levine et al. |
| 7,976,789 | 2011 Jul. 12 | Kenis et al. |
| 7,978,329 | 2011 Jul. 12 | Padmanabhan et al. |
| 7,995,194 | 2011 Aug. 9 | Wardlaw et al. |
| 8,025,854 | 2011 Sep. 27 | Ohman et al. |
| 8,033,162 | 2011 Oct. 11 | Wang |
| 8,045,165 | 2011 Oct. 25 | Wardlaw et al. |
| 8,071,051 | 2011 Dec. 6 | Padmanabhan et al. |
| 8,077,296 | 2011 Dec. 13 | Wardlaw et al. |
| 8,081,303 | 2011 Dec. 20 | Levine et al. |
| 8,092,758 | 2012 Jan. 10 | Lindberg et al. |
| 8,097,225 | 2012 Jan. 17 | Panmanachan et al. |
| 8,133,738 | 2012 Mar. 13 | Levine et al. |
| 8,158,434 | 2012 Apr. 17 | Wardlaw |
| 8,163,165 | 2012 Apr. 24 | Offenbacher et al. |
| 8,173,380 | 2012 May 8 | Yang et al. |
| 8,221,985 | 2012 Jul. 17 | Wardlaw et al. |
| 8,241,572 | 2012 Aug. 14 | Wardlaw |
| 8,269,954 | 2012 Sep. 18 | Levine et al. |
| 8,284,384 | 2012 Oct. 9 | Levine et al. |
| 8,310,658 | 2012 Nov. 13 | Wardlaw et al. |
| 8,310,659 | 2012 Nov. 13 | Wardlaw et al. |
| 8,319,954 | 2012 Nov. 27 | Wardlaw et al. |
| 8,326,008 | 2012 Dec. 4 | Lalpuria |
| 8,361,799 | 2013 Jan. 29 | Levine et al. |
| 8,367,012 | 2013 Feb. 5 | Wardlaw |
| 8,467,063 | 2013 Jun. 18 | Wardlaw et al. |
| 8,472,693 | 2013 Jun. 25 | Davis et al. |
| 8,481,282 | 2013 Jul. 9 | Levine et al. |
| 8,502,963 | 2013 Aug. 6 | Levine et al. |
| 8,569,076 | 2013 Oct. 29 | Wardlaw et al. |
| 8,638,427 | 2014 Jan. 28 | Wardlaw et al. |
| 8,778,687 | 2014 Jul. 15 | Levine et al. |
| 8,781,203 | 2014 Jul. 15 | Davis et al. |
| 8,828,741 | 2014 Sep. 9 | Ermantraut et al. |
| 8,842,264 | 2014 Sep. 23 | Wardlaw et al. |
| 8,885,154 | 2014 Nov. 11 | Wardlaw et al. |
| 8,974,732 | 2014 Mar. 10 | Lalpuria et al. |
| 8,994,930 | 2015 Mar. 31 | Levine et al. |
| 9,046,473 | 2015 Jun. 2 | Levine et al. |
| 9,084,995 | 2015 Jul. 21 | Wardlaw |
| 9,199,233 | 2015 Dec. 1 | Wardlaw |

21
-continued

| 9,274,094 | 2016 Mar. 1 | Wardlaw et al. |
| 9,291,617 | 2016 Mar. 22 | Levine et al. |
| 9,322,835 | 2016 Apr. 26 | Wardlaw |
| 9,395,365 | 2016 Jul. 19 | Levine et al. |
| 9,523,670 | 2016 Dec. 20 | Mueller et al. |
| 9,576,180 | 2017 Feb. 21 | Xie et al. |
| 9,579,651 | 2017 Feb. 28 | Phan et al. |
| 9,638,912 | 2017 May 2 | Wardlaw et al. |
| 9,696,252 | 2017 Jul. 4 | Wardlaw |
| 9,733,233 | 2017 Aug. 15 | Levine et al. |
| 9,873,118 | 2018 Jan. 23 | Verrant et al. |
| 9,885,701 | 2018 Feb. 6 | Xie et al. |
| 9,993,817 | 2018 Jun. 12 | Verrant et al. |
| 10,048,248 | 2018 Aug. 14 | Xie et al. |
| 10,203,275 | 2019 Feb. 12 | Herzog et al. |
| 10,391,487 | 2019 Aug. 27 | Verrant et al. |
| 10,578,602 | 2020 Mar. 3 | Wardlaw |
| 10,627,390 | 2020 Apr. 21 | Xie et al. |

| US Patent Application Publication No. | Publication Date | Inventor(s) |
| --- | --- | --- |
| 20020025279 | 2002 Feb. 28 | Weigle et al. |
| 20030012697 | 2003 Jan. 16 | Hahn et al. |
| 20040072278 | 2004 Apr. 15 | Chou Hou-Pu et al. |
| 20050047972 | 2005 Mar. 3 | Lauks et al. |
| 20060160164 | 2006 Jul. 20 | Miller et al. |
| 20060250604 | 2006 Nov. 9 | Hamada et al. |
| 20070036679 | 2007 Feb. 15 | Munenaka |
| 20070111302 | 2007 May 17 | Handique et al. |
| 20070243117 | 2007 Oct. 18 | Wardlaw |
| 20070254372 | 2007 Nov. 1 | Bickel et al. |
| 20070025876 | 2007 Feb. 15 | Nishijima et al. |
| 20080176253 | 2008 Jul. 28 | Christodoulides et al. |
| 20080200343 | 2008 Aug. 21 | Clemens et al. |
| 20090011518 | 2009 Jan. 8 | Lindberg |
| 20090156966 | 2009 Jun. 18 | Kontschieder et al. |
| 20090286327 | 2009 Nov. 19 | Cho et al. |
| 20100021456 | 2010 Jan. 28 | Miossec et al. |
| 20100175999 | 2010 Jul. 15 | Barlow et al. |
| 20100189338 | 2010 Jul. 29 | Lin et al. |
| 20100209304 | 2010 Aug. 19 | Sarofim |
| 20100297708 | 2010 Nov. 25 | Collier et al. |
| 20110026009 | 2011 Feb. 3 | Knutson et al. |
| 20110044862 | 2011 Feb. 24 | Chang et al. |
| 20110136152 | 2011 Jun. 9 | Lin et al. |
| 20110164803 | 2011 Jul. 7 | Wang et al. |
| 20110192219 | 2011 Aug. 11 | Miyamura |
| 20110207621 | 2011 Aug. 25 | Montagu et al. |
| 20110214745 | 2011 Sep. 8 | Zhou et al. |
| 20110244581 | 2011 Oct. 6 | Nikonorov et al. |
| 20110293489 | 2011 Dec. 1 | Zhou et al. |
| 20120004139 | 2012 Jan. 5 | Staker |
| 20120034647 | 2012 Feb. 9 | Herzog |
| 20120082599 | 2012 Apr. 5 | Weber |

EQUIVALENTS

The invention can be embodied in other specific forms without departing from the spirit or essential characteristics thereof. The foregoing embodiments are to be s considered in all respects illustrative rather than limiting on the invention described herein. In the various embodiments of the apparatuses, methods, and systems of the present invention, where the term comprises is used with respect to the recited steps or components, it is also contemplated that the apparatuses, methods, and systems consist essentially of, or consist of, the recited steps or components. Furthermore, the order of steps or order for performing certain actions is immaterial as long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as composed of the components prior to mixing, because upon mixing certain components can further react or be transformed into additional materials.

All percentages and ratios used herein, unless otherwise indicated, are by weight.

What is claimed is:

1. An analysis apparatus, comprising:
a first planar member (FPM) having an FPM first portion and an FPM second portion;
a second planar member (SPM) having a SPM first portion and a SPM second portion;
wherein the FPM second portion and the SPM second portion are spaced apart from one another to define an analysis chamber disposed between the FPM second portion and the SPM second portion, wherein the analysis chamber has a first height extending between the FPM second portion and the SPM second portion; and
wherein the FPM first portion and the SPM first portion are spaced apart from one another to define an ante-chamber disposed between the FPM first portion and the SPM first portion, wherein the ante-chamber has a second height extending between the FPM first portion and the SPM first portion, wherein the second height is greater than the first height;
wherein the ante-chamber extends lengthwise between an externally exposed open end and a second end opposite the open end, wherein the open end is configured to directly receive liquid whole blood from an external source, and the second end is contiguous with and in fluid connection with the analysis chamber;
a plurality of first separators disposed within the ante-chamber; and
a plurality of second separators disposed within the analysis chamber;
wherein the open end of the ante-chamber is configured to cause a sample of the liquid whole blood engaged across the second height of the open end of the ante-chamber to be drawn into the ante-chamber by capillary action, and the analysis chamber is configured to draw the sample of liquid whole blood from the ante-chamber by capillary action once the sample of liquid whole blood in the ante-chamber engages with the analysis chamber.

2. The apparatus according to claim 1, wherein a ratio of the second height to the first height is selected to have a value from about 1.5 to about 15.

3. The apparatus according to claim 1, wherein the FPM second portion and the SPM second portion are both transparent.

4. The apparatus according to claim 3 wherein the FPM second portion and the SPM second portion are transparent to electromagnetic radiation having wavelengths selected from ultraviolet (UV), visible, and infrared (IR) wavelengths.

5. The apparatus according to claim 4, wherein the plurality of first separators comprise a shape selected from spheres, parallelepipeds, and circular columns, and the plurality of second separators comprise a shape selected from spheres, parallelepipeds, and circular columns.

6. The apparatus according to claim 4, wherein the ante-chamber has a first volume and the analysis chamber has a second volume, and the first volume is from about 80% to about 90% of the second volume.

7. The apparatus according to claim 4, wherein said analysis chamber has a volume from about 0.2 to about 1 microliters.

8. The apparatus according to claim 4 comprising one or more sidewalls extending between and in contact with the first planar member and the second planar member.

9. The apparatus according to claim 1, further comprising an absorbent means for removing excess liquid whole blood from contact with the open end of the ante-chamber.

10. The apparatus according to claim 2, wherein the SPM first portion comprises a white or opaque backing or coating.

11. The apparatus according to claim 2, wherein at least one of said first planar member or said second planar member has a third portion that extends beyond the area defining said analysis chamber and that defines a scribable region.

* * * * *